United States Patent [19]
Nguyen

[11] Patent Number: 6,122,509
[45] Date of Patent: Sep. 19, 2000

[54] METHOD AND SYSTEM FOR AUTOMATICALLY CONNECTING A CALL AT A SELECTED TIME IN A RADIO TELECOMMUNICATIONS NETWORK

[75] Inventor: Thien Nguyen, Montreal, Canada

[73] Assignee: Telefonaktiebolaget L M Ericsson (publ), Stockholm, Sweden

[21] Appl. No.: 08/939,590

[22] Filed: Sep. 29, 1997

[51] Int. Cl.$^7$ .................................................. H04M 11/00
[52] U.S. Cl. ........................... 455/433; 455/414; 455/460
[58] Field of Search ..................... 455/433, 422, 455/460, 414, 416, 417; 379/88.12, 88.21, 67.1, 209, 88.25, 202, 207, 115

[56] References Cited

U.S. PATENT DOCUMENTS

| | | | |
|---|---|---|---|
| 4,817,126 | 3/1989 | Hendershot | 455/404 |
| 4,969,185 | 11/1990 | Dorst et al. | 379/209 |
| 5,016,269 | 5/1991 | Rogers | 455/404 |
| 5,224,146 | 6/1993 | Tanaka et al. | 379/61 |
| 5,311,574 | 5/1994 | Livanos | 379/88 |
| 5,406,616 | 4/1995 | Bjorndahl | 340/59 |
| 5,504,804 | 4/1996 | Widmark et al. | 379/63 |
| 5,625,683 | 4/1997 | Nazanin et al. | 379/355 |
| 5,652,789 | 7/1997 | Miner et al. | 379/201 |
| 5,692,033 | 11/1997 | Farris | 379/67 |
| 5,848,132 | 12/1998 | Morley et al. | 379/88 |
| 5,884,161 | 3/1999 | Hegeman | 455/414 |
| 5,903,845 | 5/1999 | Buhrmann et al. | 455/461 |
| 5,963,864 | 10/1999 | O'Neil et al. | 455/445 |
| 6,035,187 | 3/2000 | Franza | 455/404 |

FOREIGN PATENT DOCUMENTS

| | | |
|---|---|---|
| 0435449A2 | 7/1991 | European Pat. Off. |
| 2 306 276 | 4/1997 | United Kingdom ............ H04Q 7/32 |
| WO 97/34406 | 9/1997 | WIPO |

*Primary Examiner*—Dwayne D. Bost
*Assistant Examiner*—Joy K. Redmon
*Attorney, Agent, or Firm*—Smith & Danamraj, P.C.

[57] ABSTRACT

A method and system for automatically setting up a call in a radio telecommunications network. The system includes a first mobile switching center (MSC) servicing and controlling an area where a originating MS is located and a home location register (HLR) associated with the first MSC. The originating MS sends data which includes the selected time and a destination number of a terminating party. Within the HLR is service logic which determines when the selected time has arrived and initiates the call. Upon determining that the originating MS is idle and available, the HLR establishes a voice channel between the first MSC and the originating MS. Additionally, the HLR establishes a voice channel between the terminating party and a second MSC if the terminating party is a mobile station. The system also records a message for delivery at the selected time to the originating party. Additionally, the terminating party may be a telephone in the Public Switched Telephone Network (PSTN).

36 Claims, 21 Drawing Sheets

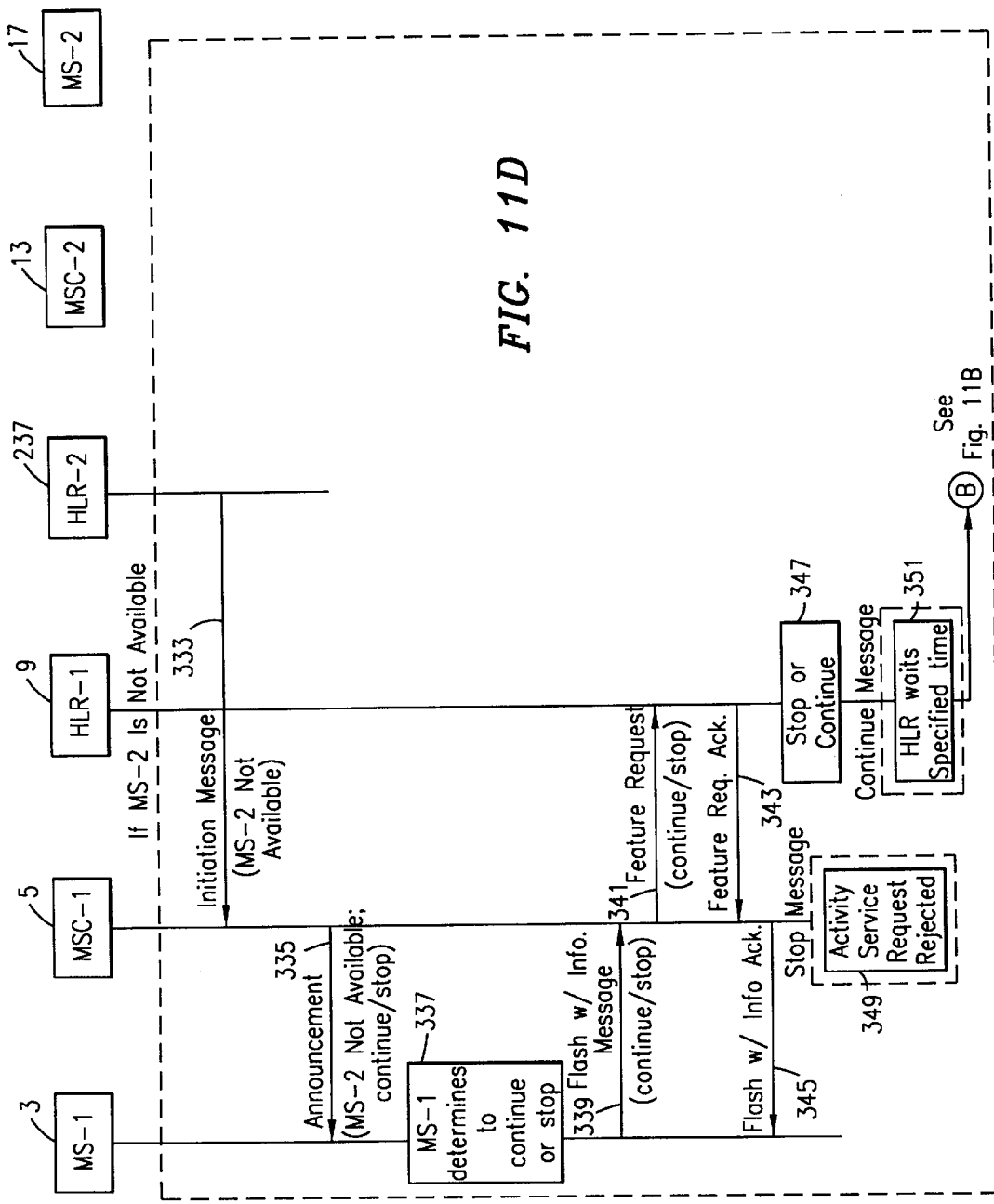

METHOD AND SYSTEM FOR AUTOMATICALLY CONNECTING A CALL AT A SELECTED TIME IN A RADIO TELECOMMUNICATIONS NETWORK

BACKGROUND OF THE INVENTION

1. Technical Field of the Invention

This invention relates to radio telecommunication systems and, more particularly, to a method and system for automatically setting up a call at a selected time in a radio telecommunications network.

2. Description of Related Art

Many people today are very busy, leading complicated and full schedules. Additionally, some people must place important calls at specific times of the day. Because of the complexity of people's schedules, they require some form of reminder of their planned daily activities. Typically, activities are written down in a notebook to remind a person of specific activities at specific times. However, there are several disadvantages to using a notebook to remind the person of specific activities. Although the activities are written, there is no alarm to alert the person that an impending activity is required. A person can still forget to look at the notebook, or become distracted by other events and completely miss the planned activity. Additionally, the activity may involve placing a telephone call at a specific time. The notebook again cannot alert the person to place the phone call. The person must still remember to make the telephone call.

In addition, there is a widespread growth of radio telecommunications services providing many useful services to mobile subscribers. It would be advantageous to have a system and method which automatically initiates calls to a specific telephone number at a predetermined time and warns the mobile subscriber of the call connection. A system and method is also needed which notifies the mobile subscriber of an impending activity. Although there are no known prior art teachings of a solution to the aforementioned deficiency and shortcoming such as that disclosed herein, prior art references that discuss subject matter that bears some relation to matters discussed herein are U.S. Pat. No. 5,224,146 to Tanaka et al. (Tanaka), U.S. Pat. No. 5,504,804 to Widmark et al. (Widmark), United Kingdom Patent Number GB 2,306,276 to Nam (Nam), and U.S. Pat. No. 5,625,683 to Nazanin et al. (Nazanin).

Tanaka discloses a radio telephone system which includes a base unit connected to a wired telephone line and a radio telephone set connected to the base unit through a radio link which has a function of automatically calling another telephone set at intervals of a predetermined time. Tanaka does not teach or suggest a system or method for automatically placing a call at a specific time. Tanaka merely discloses a system which repeatedly calls a specific number until the other party answers the call. Tanaka does not provide for automatically calling another number at a specific time nor does Tanaka provide any alerting function to inform a person of an impending activity.

Widmark discloses a method of call routing based on a subscriber's service information stored in a home location register (HLR) in a radio telecommunications network. The subscriber makes a call to another person (called the B-party) using a short number service. Short number service enables the subscriber to use a short number to call the B-party roaming within the radio telecommunications network. Widmark does not teach or suggest a system or method for automatically placing a call to another party at a specific time, nor does Widmark disclose an alerting function to inform the subscriber of an impending activity.

Nam discloses a method for automatically placing a call which is implemented within a mobile telephone. The user of the mobile telephone must press a communication reservation registering key on the mobile telephone and then enter the telephone number of the person to whom he wishes to speak and the time at which he wishes to speak. The telephone number and time are displayed and stored in a memory in the mobile telephone. A control unit located within the mobile telephone periodically checks the memory to see if a communication reservation has been made. If a communication reservation has been made, a timer within the mobile telephone determines if the reserved time has arrived. If the reserved time has arrived, the mobile telephone automatically places a call to the reserved number. However, Nam requires the modification or replacement of existing mobile telephones in order to perform the automatic call function. Nam does not teach or suggest a system or method for automatically placing a call to another party at a specific time without extensive modifications to a user's mobile telephone.

Nazanin discloses a method of reminding a user to place a call and dialing the specified telephone number when the user desires to place the call. The user inputs a specific time and telephone number into his mobile telephone. At the specified time, the mobile telephone signals the user by displaying the telephone number and emitting a noise through a speaker in the mobile telephone. Upon viewing the displayed telephone number, the user can cancel the call or confirm placement of the call to the telephone number by pressing a key. If confirmed, the mobile telephone dials the telephone number. Nazanin requires the modification of the mobile telephone itself. Additionally, the specified telephone number is not automatically dialed without the user's confirmation at the specified time. Nazanin does not teach or suggest a system or method for automatically placing a call at a specific time without major modifications to a user's mobile telephone.

Thus, it would be a distinct advantage to have a system and method providing a warning function within a mobile station to remind a subscriber of an impending activity. Additionally, a system and method are needed which automatically initiates a call to a specific telephone number at a designated time within a radio telecommunications network without requiring extensive modifications to mobile telephones.

SUMMARY OF THE INVENTION

In one aspect, the present invention is a system in a radio telecommunications network for automatically setting up a call at a selected time between a originating mobile station (MS) and a terminating MS. The system comprises a first mobile switching center (MSC) that services and controls an area where the originating MS is located and a home location register (HLR) associated with the first MSC which includes means for storing the selected time and a destination number. The HLR also includes service logic to determine when the selected time has arrived. Additionally, the service logic initiates the call to the destination number at the selected time. The system also includes means for completing the call.

In another aspect, the invention is a system in a radio telecommunications network for automatically connecting a call at a selected time between a originating MS and a terminating MS. The system comprises a first MSC servicing and controlling an area where the originating MS is located, a second MSC servicing and controlling an area where the terminating MS is located, and a HLR associated with the first MSC for storing the selected time and a destination number of the terminating MS. The HLR has service logic to determine when the selected time has arrived. The service logic initiates the call at the selected time. Additionally, the system includes means for completing the call. The means for completing the call includes means for setting up a first voice channel between the originating MS and the first MSC, means for setting up a second voice channel between the terminating MS and the second MSC, and means for establishing a trunk between the first MSC and the second MSC.

In another aspect, the present invention is a system in a radio telecommunications network for setting up a call at a selected time between a originating MS and a terminating telephone in a Public Switched Telephone Network (PSTN). The system comprises a MSC servicing and controlling an area where the originating MS is located and a gateway mobile switching center (G-MSC) for connecting the terminating PSTN telephone to the radio telecommunications network. The system also includes an HLR associated with the MSC for storing the selected time and a destination number of the terminating PSTN telephone. The HLR includes service logic which determines when the selected time has arrived and initiates the call at the selected time. In addition, the system includes means for completing the call.

In still another aspect, the present invention is a method in a radio telecommunications network of automatically connecting a call at a selected time between a originating MS and a terminating party. The method begins by the originating MS sending a message with data to a first MSC specifying the selected time and a selected destination for the call to a first MSC. Next, the first MSC sends the data to a HLR. The HLR then stores the selected time and destination. Next, service logic within the HLR determines when the selected time has arrived. A first voice channel is then established between the first MSC and the originating MS. Next, if the terminating party is available, the originating MS is connected to the terminating party.

In another aspect, the present invention is a method in a radio telecommunications network of automatically setting up a call at a selected time between a originating MS and a terminating MS. The method begins by the originating MS sending a message with data specifying the selected time and a selected destination for the call to a first MSC. Next, the first MSC sends the data to an HLR. The HLR stores the selected time and destination. Next, service logic within the HLR determines when the selected time has arrived. Then, it is determined if the originating MS is busy, upon determining that the selected time has arrived. A first voice channel between the first MSC and the originating MS is established, upon determining that the originating MS is idle. Next, it is determined if the terminating MS is available. The HLR then waits a specific time period before determining if the terminating MS is available. Upon determining that the terminating party is available, a second voice channel is established between the terminating MS and a second MSC servicing an area in which the terminating MS is located. The originating MS is then connected to the terminating MS.

In another aspect, the present invention is a method in a radio telecommunications network of automatically setting up a call at a selected time between a originating MS and a terminating party in a PSTN. The method begins by the originating MS sending a message with data to a MSC specifying the selected time and a selected destination for the call. Next, the MSC sends the data to an HLR and stores the data in the HLR. The HLR determines, through service logic within the HLR, when the selected time has arrived. A first voice channel between the first MSC and the originating MS is established, upon determining that the selected time has arrived. Next, it is determined if the terminating party is available. Then, the MSC is joined to a G-MSC through a trunk, upon determining that the terminating party is available. The originating MS is then connected to the terminating party.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIGS. 11A–11E are flow charts outlining the steps of the method of activity call service for an originating MS (MS-1) and a terminating MS (MS-2) using different HLRs according to the teachings of the present invention.

DETAILED DESCRIPTION OF EMBODIMENTS

The present invention is a system and method of setting up a call at a selected time in a radio telecommunications network (i.e., activity call service). The present invention may set up calls under a variety of scenarios. Three exemplary scenarios are described herein: (1) an originating mobile station (MS) calls a second MS serviced by one home location register (HLR); (2) an originating MS calls a Public Switched Telephone Network (PSTN) telephone; and (3) an originating MS serviced by a first HLR calls a second MS serviced by a second HLR.

Figure 1:
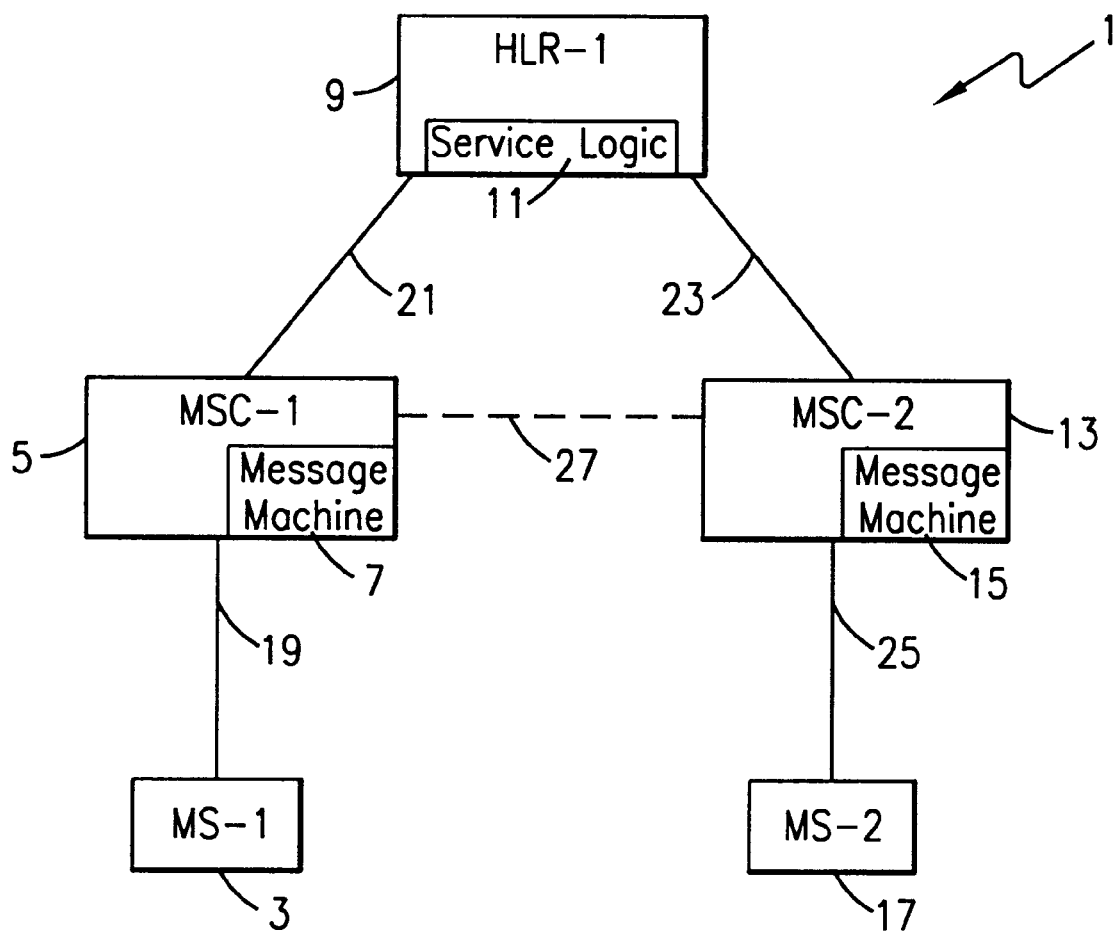
FIG. 1 is a simplified block diagram illustrating the components of a telecommunications system for an originating MS (MS-1) and a terminating MS (MS-2) using a single HLR in the preferred embodiment of the present invention.

FIG. 1 is a simplified block diagram illustrating the components of a telecommunications system 1 for an originating MS (MS-1) and a terminating MS (MS-2) using a single HLR in the preferred embodiment of the present invention. The telecommunications system 1 includes a mobile station-1 (MS-1) 3, a mobile switching center-1 (MSC-1) 5 having a message machine 7, a home location register-1(HLR-1) 9 having service logic 11, a MSC-2 (13) having a message machine 15, a MS-2 (17), and communications links 19–27. Base stations are omitted for simplicity.

The MS-1 is located in a service area controlled by the MSC-1. The MSC-1 provides all of the controlling and switching functions for the MS-1. The MS-2 is located in a service area controlled by the MSC-2. The MSC-2 provides all of the controlling and switching functions for the MS-2. Associated with the MS-1 and the MS-2 is the HLR-1 which contains a database with the subscriber class and location of the mobile stations which it serves. Both MS-1 and MS-2 are serviced by the same HLR, HLR-1. Additionally, the HLR-1 has service logic 11 for determining and initiating a specific activity at a specific time. The service logic 11 also enables the HLR-1 to initiate a call set-up between the MS-1 and the MS-2. Integrated into every mobile switching center is a message machine for the storage of messages and the production of announcements to the mobile stations within its service area.

Figure 2:
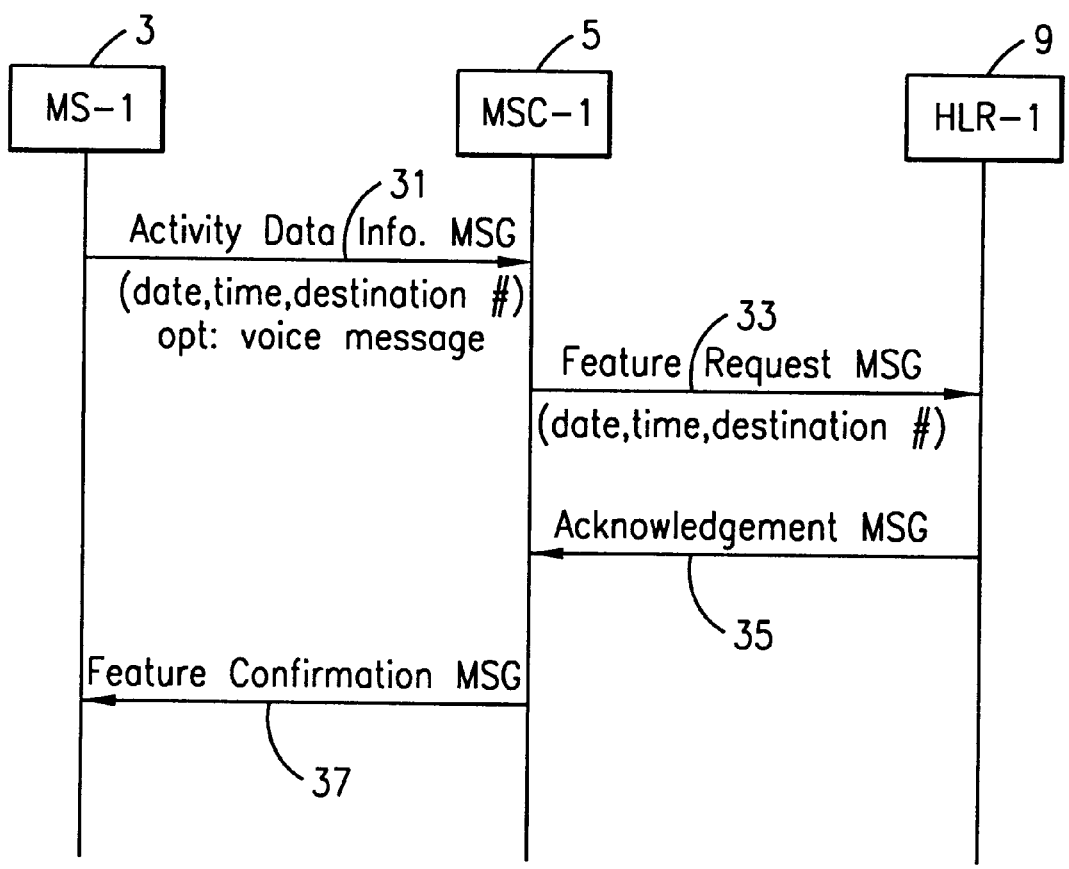
FIG. 2 is a signaling diagram illustrating activity call service set-up according to the teachings of the present invention.

FIG. 2 is a signaling diagram illustrating activity call service set-up according to the teachings of the present invention. Referring to FIGS. 1 and 2, MS-1 initiates a service call by sending an Activity Data Information message 31 containing the date, time, destination number and voice message (if required) to the MSC-1. For example, the mobile subscriber may input #ZZ*DDMMYY*HHMMSS*NNNNNNN, where ZZ is the request code for activity call service, DDMMYY is the date, HHMMSS is the time of day for which the service is requested and NNNNNNN is the number where the call is to be connected. Additionally, the mobile subscriber may send a message to his own mobile station, thereby providing a message to himself at a selected time (e.g., a reminder of an impending activity). For example, the mobile subscriber may input #XX*DDMMYY*HHMMSS*NNNNNNN, where XX is the request code for activity call service whereby a message may be sent and NNNNN is the MS-1's own telephone number. In this embodiment, after inputing the code, the MS-1 is prompted to record a voice message.

A radio telecommunications network operator may offer the activity call service to all mobile stations or provide the service optionally to individual mobile stations paying for the activity call service. If the service is provided to all mobile stations, there is no need to verify that the requesting mobile station has the service. However, if the network operator provides the activity call service as a paid option, upon receipt of the Activity Data Information message 31, the MSC-1 performs a check to verify that the MS-1 has activity call service (i.e., the mobile subscriber has subscribed to the activity call service). If the MS-1 does not subscribe to activity call service, the request for the activity call service is rejected. However, if the MS-1 does subscribe to activity call service, the MSC-1 sends a Feature Request message 33 containing the date, time and destination number to the HLR-1. The HLR-1 then stores the information in the subscriber record for the MS-1. If a voice message has been sent by the MS-1, the voice message is stored within the message machine 7 located within the MSC 5. Once the HLR-1 successfully receives the Feature Request message 33, the HLR-1 sends an Acknowledgment message 35 to the MSC-1 acknowledging receipt of the Feature Request message 33. The MSC-1 then sends a Feature Confirmation message 37 to the MS-1 indicating that the selected activity service is active. The Feature Confirmation message 37 may be a verbal message or an aural indication produced and sent from the message machine 7.

Figure 3:
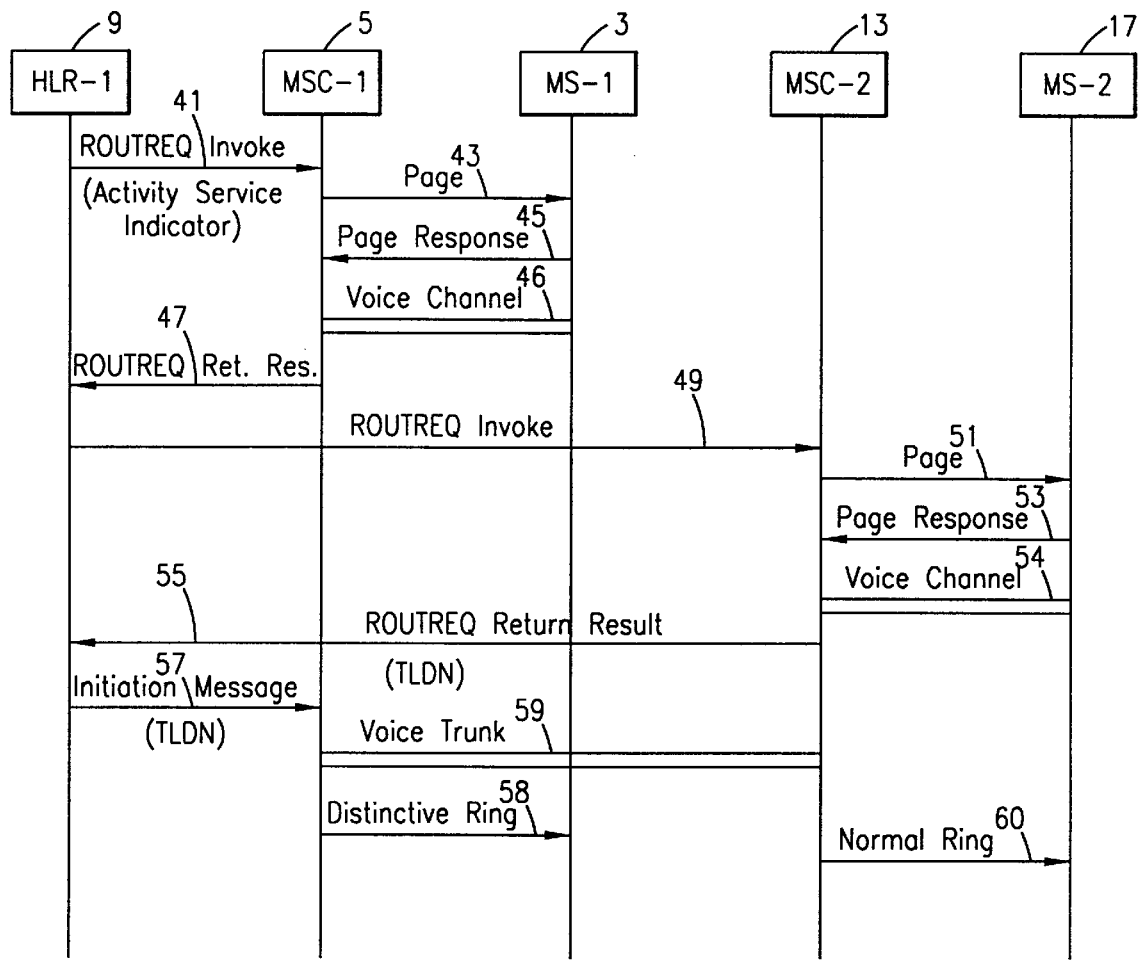
FIG. 3 is a signaling diagram illustrating the activity call service process for an originating MS (MS-1) and a terminating MS (MS-2) using a single HLR-1 according to the teachings of the present invention.

Once the activity call service set-up is complete, the system initiates the requested call at the designated time. FIG. 3 is a signaling diagram illustrating the activity call service process for an originating MS (MS-1) 3 and a terminating MS (MS-2) 17 using a single HLR-1 (9) according to the teachings of the present invention. Referring to FIGS. 1, 2, and 3, the activity call process will be explained. When the service logic 11 within the HLR-1 has determined that the selected time (as inputed by the originating MS (MS-1) in the Activity Data Information message 31) has arrived, the service logic 11 prompts the HLR-1 to send a Route Request (ROUTREQ) Invoke message 41 to the MSC-1. The ROUTREQ Invoke message 41 contains an activity service indicator, prompting the MSC-1 to generate a special ringing at call connection. The MSC-1 then sends a Page 43 to the MS-1 to verify the availability of the MS-1. The MS-1 sends a Page Response message 45 acknowledging receipt of the Page 43 and the status of the MS-1 to the MSC-1. Once, the MSC-1 receives the Page Response message 45, the MS-1 is connected to a voice channel 46 with the MSC-1, if the MS-1 is available. Upon establishing the voice channel 46, the MSC-1 sends a ROUTREQ Return Result message 47 to the HLR-1 indicating the availability of the MS-1.

If the MS-1 is busy, the HLR-1 waits until the MS-1 is idle and then starts the process again. If the MS-1 cannot be found (i.e., no page response is received), the activity call service may be attempted again after a specified time, depending on the level of activity call service to which the MS-1 subscribes. The network operator may offer different optional levels for the activity call service. For example, if the MS-1 subscribes to activity call service level 1, the activity call process may be initiated again after, for example, 10 minutes. If the MS-1 subscribes to activity call service level 2, the activity call process may be initiated twice every 10 minutes. After a specific number of repetitions determined by the radio telecommunications network operator, the call is terminated for that activity call request if the MS-1 still cannot be found.

Once the HLR-1 receives the ROUTREQ Return Result message 47 indicating the available status of the MS-1, the HLR-1 sends a second ROUTREQ Invoke message 49 to the MSC-2 to verify the availability of the MS-2. If the MS-2 is not busy, the MSC-2 then pages the MS-2 at 51. If the MS-2 is busy or cannot be found (i.e., there is no page response), a ROUTREQ Return Result message is sent to the HLR-1 with the status of MS-2. The HLR-1 then sends a message to the MS-1 indicating the status of the MS-2 via the message machine 7 within the MSC-1 5. The MS-1 is provided the option of repeating the activity call after a predetermined time period such as, for example, ten minutes, or terminating the activity call request.

If MS-2 is available, the MS-2 responds to the page by sending a Page Response message 53 to the MSC-2 indicating its availability. Once the MSC-2 receives the Page Response message 53, the MSC-2 sets up a voice channel 54 with the MS-2, if the MS-2 is available. Then, the MSC-2 sends a ROUTREQ Return Result message 55 containing a roaming routing number, such as a TLDN, to the HLR-1 indicating the location and availability status of the MS-2. The HLR-1 then sends an Initiation message 57 containing the Roaming Routing Number to the MSC-1. The Initiation message 57 also contains an order to the MSC-1 to connect a voice trunk 59 with the MSC-2. Additionally, if a voice message has been recorded by MS-1, the Initiation message 57 will instruct the MSC-1 to deliver the recorded message to the MS-1 if the MS-1 is calling itself, or to MS-2 if MS-1 is calling another MS.

Upon receipt of the Initiation message 57, the MSC-1 delivers the call to the MSC-2 by establishing the trunk 59. At call connection, MSC-1 sends MS-1 a distinctive ring 58 to distinguish the call from a regular call. The MS-2 receives a normal ring 60 alerting the MS-2 of an incoming call. Once the call is connected, the data stored for the requested activity call service is deleted from the HLR-1.

Figure 4:
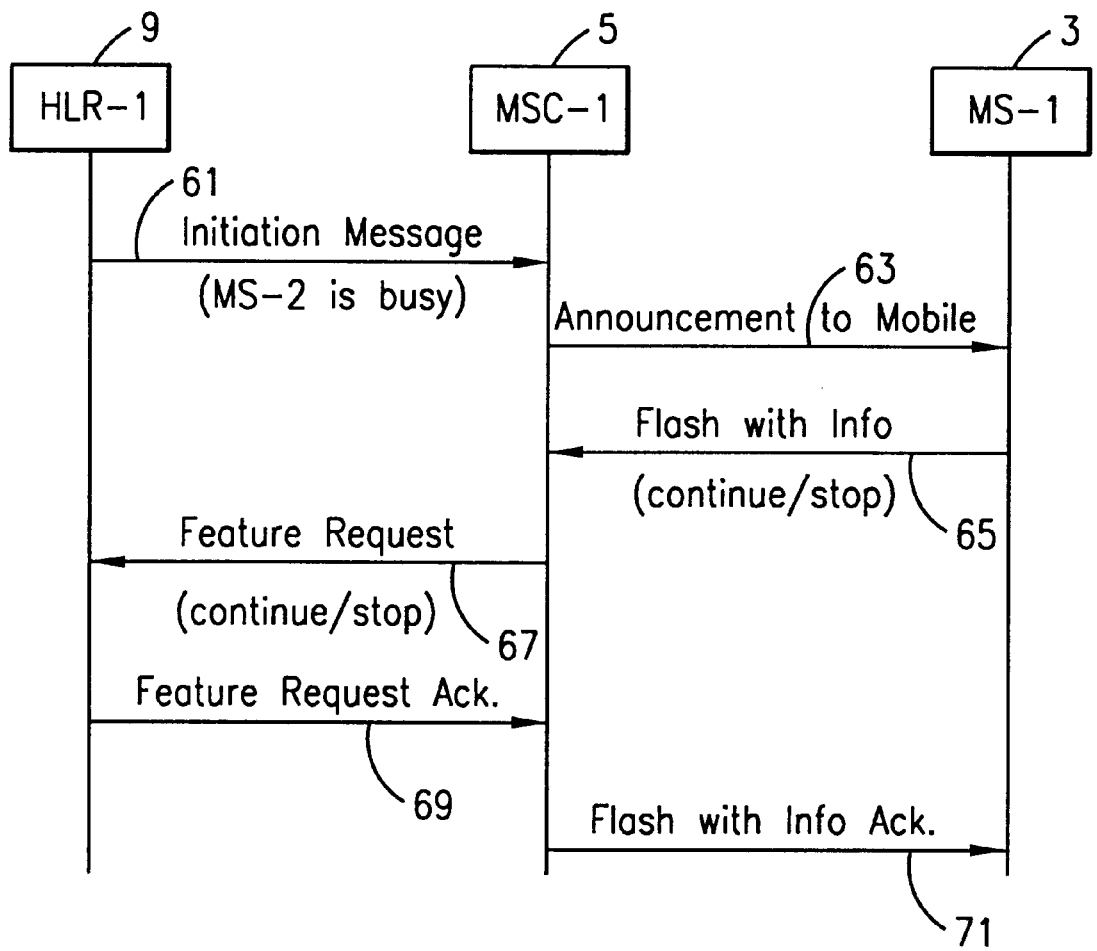
FIG. 4 is a signaling diagram illustrating the activity call service process when a terminating MS is busy or unavailable.

FIG. 4 is a signaling diagram illustrating the activity call service process when a terminating MS is busy or unavailable. If the MS-2 is unavailable (e.g., mobile telephone is not turned on) or busy, the ROUTREQ Return Result message 55 (FIG. 3) indicates the status to the HLR-1. The HLR-1 then sends an Initiation Message 61 to the MSC-1 indicating the busy or unavailable status of the MS-2. The MSC-1, through the message machine 7, sends an announcement 63 to the MS-1. The announcement 63 indicates that the MS-1 may continue the activity service call after a selected time (e.g., 10 minutes) or terminate the activity service call. The MS-1 indicates which option is chosen by sending a Flash with Info message 65 to the MSC-1 containing an order to continue the activity service call or stop the activity service call request. The MSC-1 forwards the order in a Feature Request message 67 to the HLR-1. The HLR-1 responds by sending a Feature Request Acknowledgment message 69 to the MSC-1. The MSC-1 then sends a Flash with Info Acknowledgment message 71 to the MS-1.

Figure 5A:
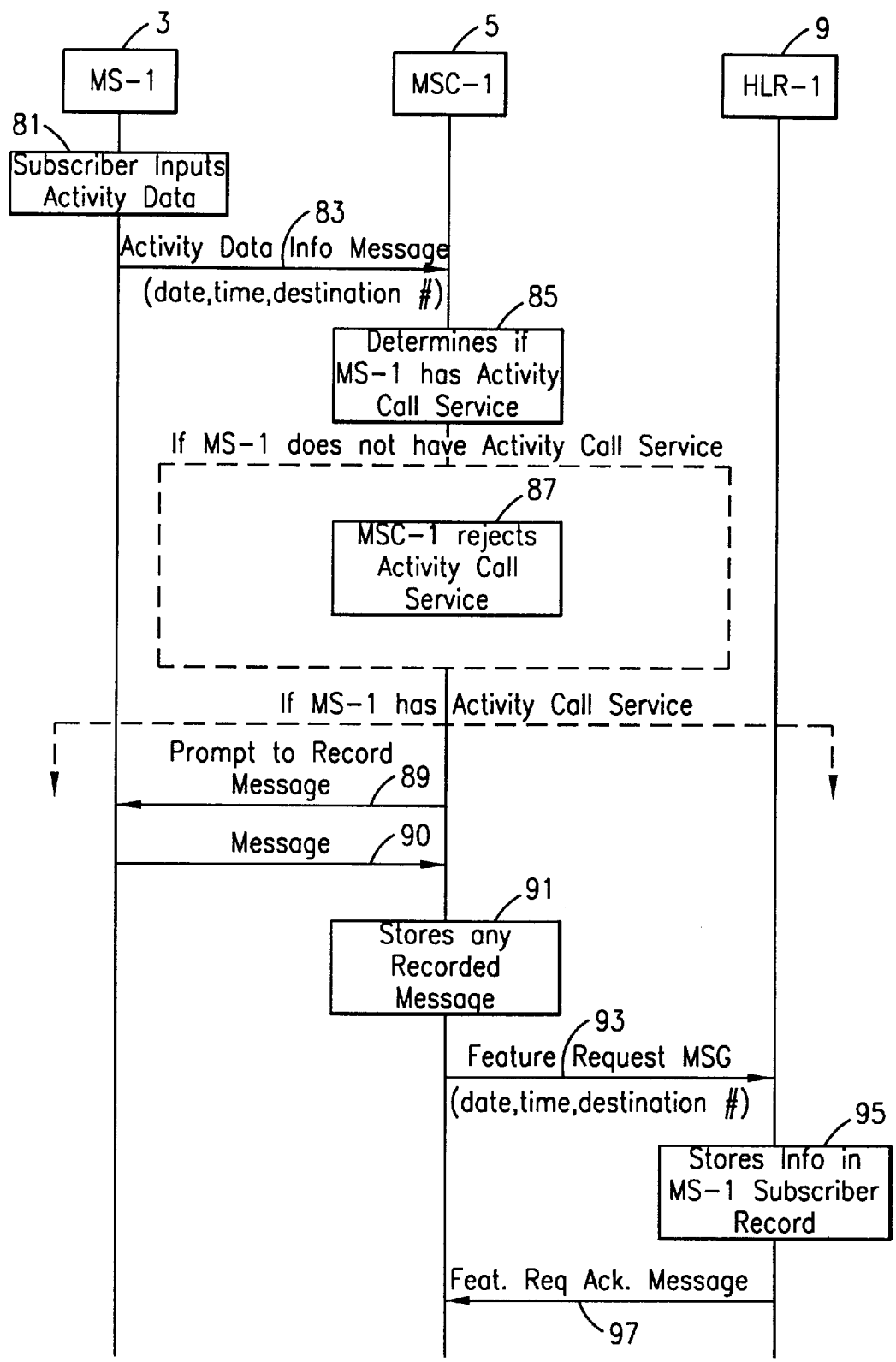
FIGS. 5A–5D are flow charts outlining the steps of the method of activity call service for an originating MS (MS-1) and a terminating MS (MS-2) using a single HLR-1 according to the teachings of the present invention.

FIGS. 5A–5D are flow charts outlining the steps of the method of activity call service for an originating MS (MS-1) 3 and a terminating MS (MS-2) 17 using a single HLR-1 (9) according to the teachings of the present invention. Referring to FIGS. 1, 2, 3, 4, and 5A–5D, the method will now be described. In FIG. 5A, the method begins at step 81, by a mobile subscriber inputing activity data (as described in FIG. 2) into the MS-1.

At step 83, the MS-1 sends an Activity Data Information message containing the date, time, destination number and voice message (if required) to the MSC-1. In step 85, in the situation where the network operator offers the service as a paid option, upon receipt of the Activity Data Information message, the MSC-1 determines if the MS-1 subscribes to activity call service. If the MS-1 does not subscribe to activity call service, the method moves to step 87 where the request for the activity call service is rejected. However, if the MS-1 does subscribe to activity call service, the method moves from step 85 to step 89 where the MSC-1 prompts the MS-1 to record a message. In step 90, a verbal message may optionally be sent to the MSC-1. Next, in step 91, the MSC-1 stores the recorded message, if any, in the message machine 7. Then in step 93, the MSC-1 sends a Feature Request message containing the date, time, and destination number to the HLR-1. In step 95, the HLR-1 stores the information in the MS-1's subscriber record. Then, in step 97, the HLR-1 sends a Feature Request Acknowledgment message to the MSC-1.

Figure 5B:
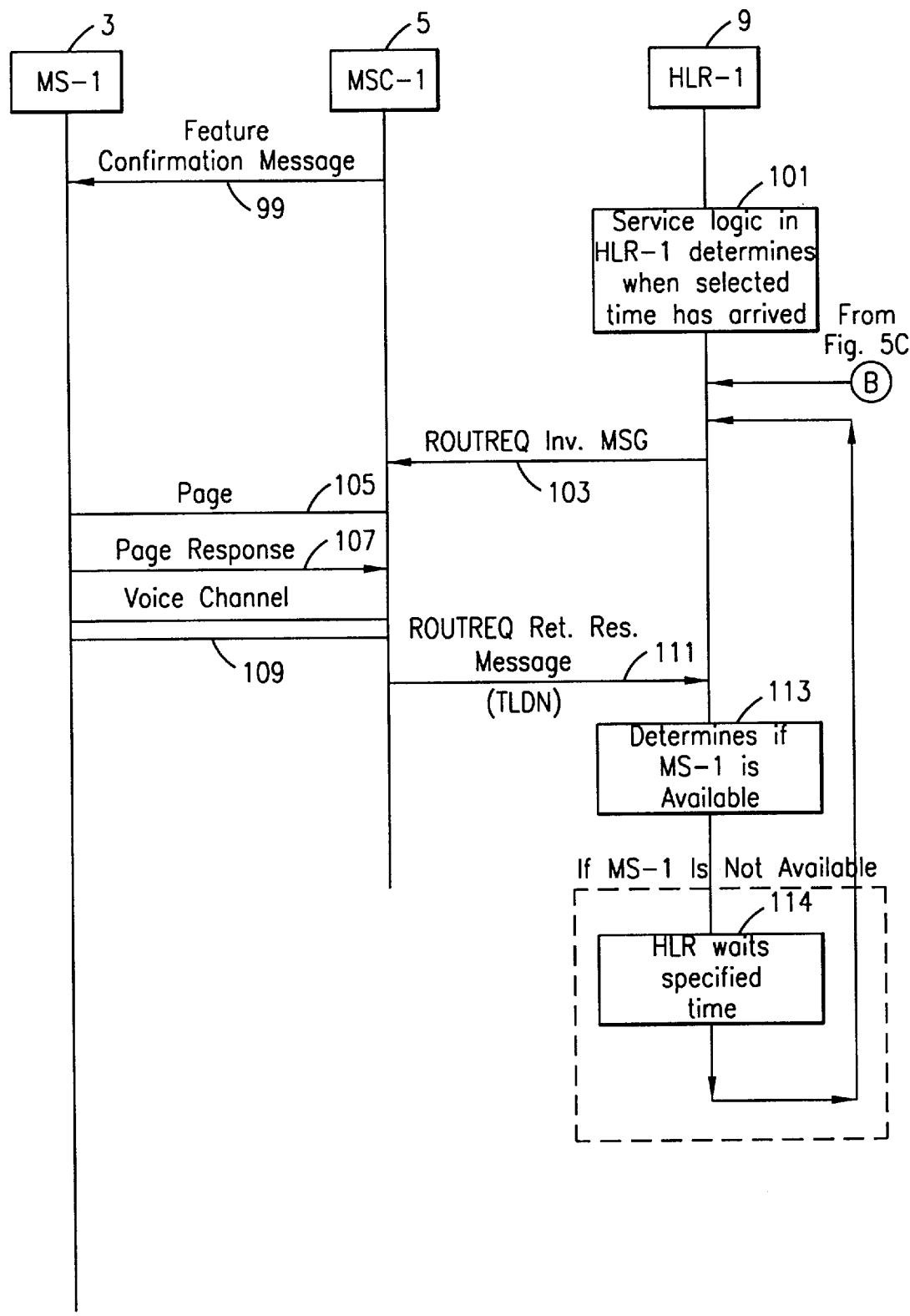

The process then continues in FIG. 5B. In step 99, the MSC-1 then sends a Feature Confirmation message to the MS-1 indicating that the selected activity call service is active. The Feature Confirmation message may be a verbal message or an aural indication produced and sent from the message machine 7.

In step 101, the service logic 11 in the HLR-1 (FIG. 1) determines when the selected time, as inputed by the MS-1 in the Activity Data Information message, has arrived. In step 103, the HLR-1 verifies the availability of the MS-1 by sending a ROUTREQ Invoke message to the MSC-1. In step 105, if the MS-1 is not busy, the MSC-1 sends a Page to the MS-1. In step 107, if the MS-1 is available, the MS-1 responds by sending a Page Response message to the MSC-1. Next in step 109, the MSC-1 sets up a voice channel with the MS-1, if the MS-1 is available. In step 111, the MSC-1 then sends a ROUTREQ Return Result message to the HLR-1, indicating the availability of MS-1 and a routing number such as a TLDN.

Next, in step 113, it is determined in the HLR-1 whether the MS-1 is available or unavailable (i.e., busy or power off). If it is determined that the MS-1 is not available, the method moves from step 113 to step 114, where the HLR-1 waits a specified amount of time, depending on the level of activity call service to which the MS-1 subscribes. Then, the method moves from step 114 to step 103 where the process begins again.

Figure 5C:
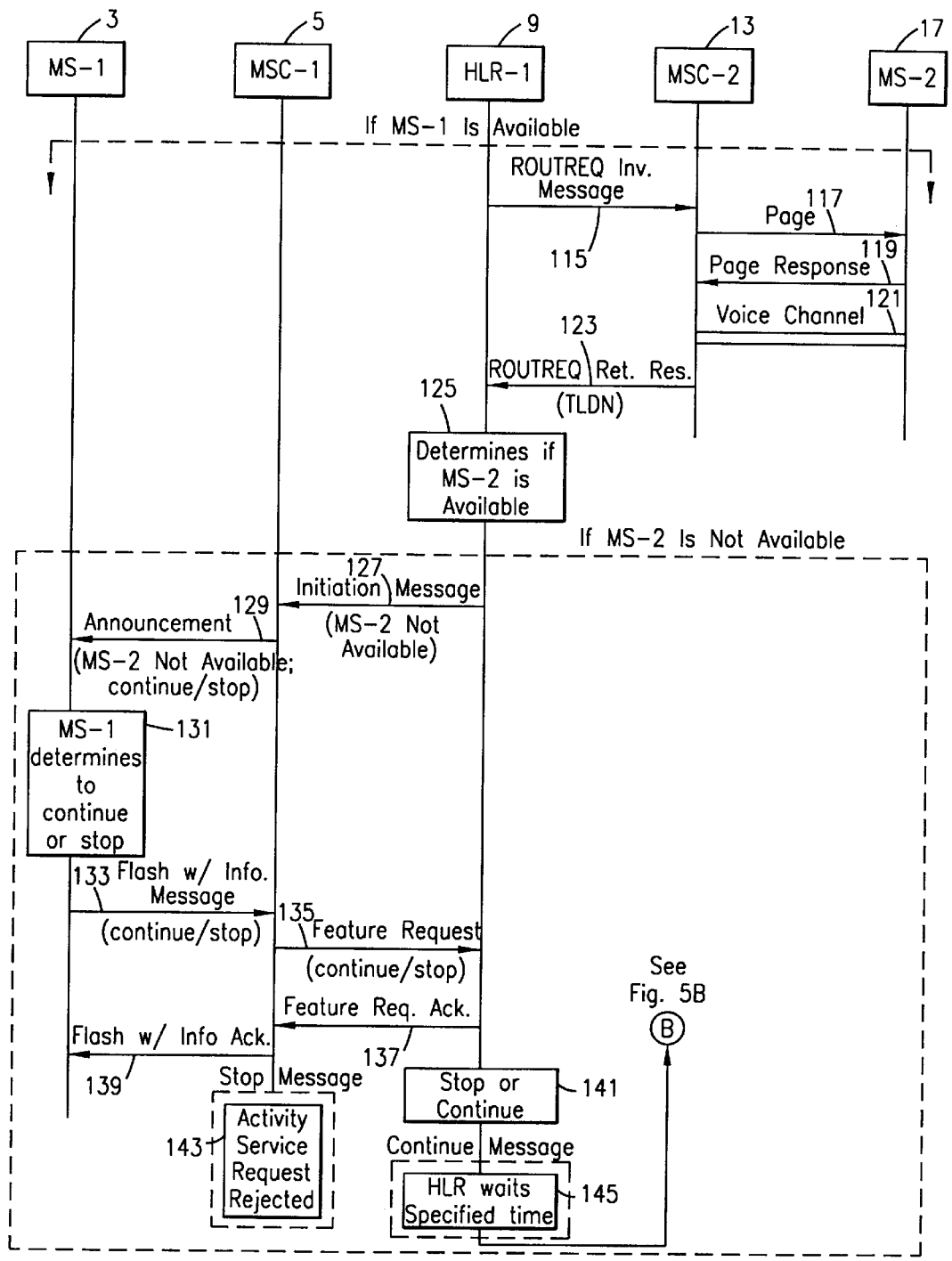

The process then continues in FIG. 5C. If it is determined at step 113 that the MS-1 is available, the method moves from step 113 to step 115 where the HLR-1 determines the availability of MS-2. This is done by the HLR-1 sending a ROUTREQ Invoke message to the MSC-2. Next, in step 117, if the MS-2 is not busy, the MSC-2 sends a Page to the MS-2. In step 119, if the MS-2 is available, the MS-2 responds to the Page by sending a Page Response to the MSC-2 indicating the availability of MS-2. In step 121, the MSC-2 sets up a voice channel between the MSC-2 and the MS-2, if the MS-2 is available. Next, in step 123, the MSC-2 sends a ROUTREQ Return Result message containing a roaming routing number, such as a TLDN, to the HLR-1 indicating the routing number and status of the MS-2. In step 125, the HLR-1 determines the status of MS-2 (i.e., whether MS-2 is available).

If the HLR-1 determines that the MS-2 is not available, the method moves to step 127 where an Initiation message, containing the status of MS-2 (e.g., busy or no response), is sent from the HLR-1 to the MSC-1. Next, in step 129, an announcement is sent from MSC-1, utilizing the message machine 7 (FIG. 1), to the MS-1 indicating the non-availability of the MS-2. In the announcement, the MS-1 may be given the option of repeating the activity call service after a predetermined time period or stopping the activity call request. The MS-1 chooses to "continue" the activity call service request or to "terminate" the request. In step 131, the MS-1 subscriber determines to continue or stop by inputing a code, such as "1" for option 1 or "2" for option 2. Then, in step 133, the MS-1 sends a Flash with Info message to the MSC-1 containing the chosen option.

In step 135, the MSC-1 sends a Feature Request message, with the continue or stop order, to the HLR-1. In step 137, the HLR-1 sends a Feature Request Acknowledgment to the MSC-1, indicating receipt of the Feature Request message. Next, in step 139, the MSC-1 sends a Flash with Info Acknowledgment message to the MS-1. Next, in step 141, the HLR-1 determines if the MS-1 wants to continue or terminate the activity call request. If the MS-1 is stopping the request, the HLR orders the MSC-1 to stop service at step 141 and the activity service request is rejected at step 143. However, if the MS-1 chooses to continue, the method moves from step 141 to step 145 where the HLR-1 waits the predetermined time period and then initiates the activity service call request again. Then, after the time period has passed, the method returns to step 103 (FIG. 5B).

Figure 5D:
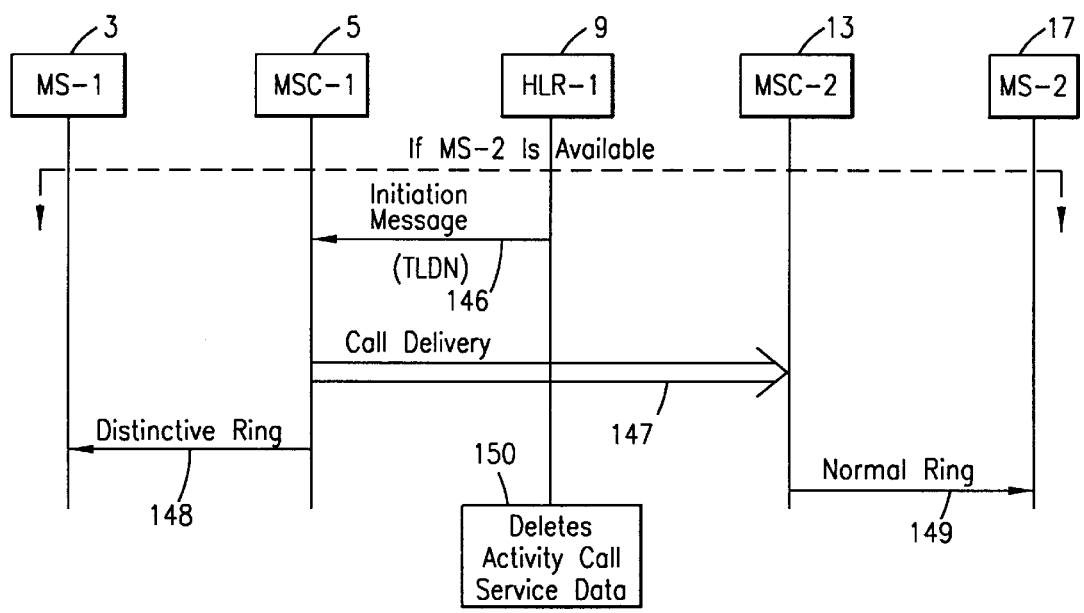

In step 125, if the HLR-1 determines that the MS-2 is available, the method moves from step 125 to FIG. 5D, step 146, where the HLR-1 sends an Initiation message containing the roaming routing number to the MSC-1. The Initiation message also contains an order to the MSC-1 to connect a call with the MSC-2 and deliver any recorded message to the MS-1. Then, in step 147, the call is delivered at the selected time by establishing a trunk between the MSC-1 and the MSC-2. At call alert, the MS-1 may receive a distinctive ring 148 to distinguish the call from a regular call. The MS-2 may receive a normal alert signal 149 alerting the MS-2 of an incoming call. Next, in step 150, the HLR-1 deletes the activity call service data stored within the HLR-1.

Figure 6:
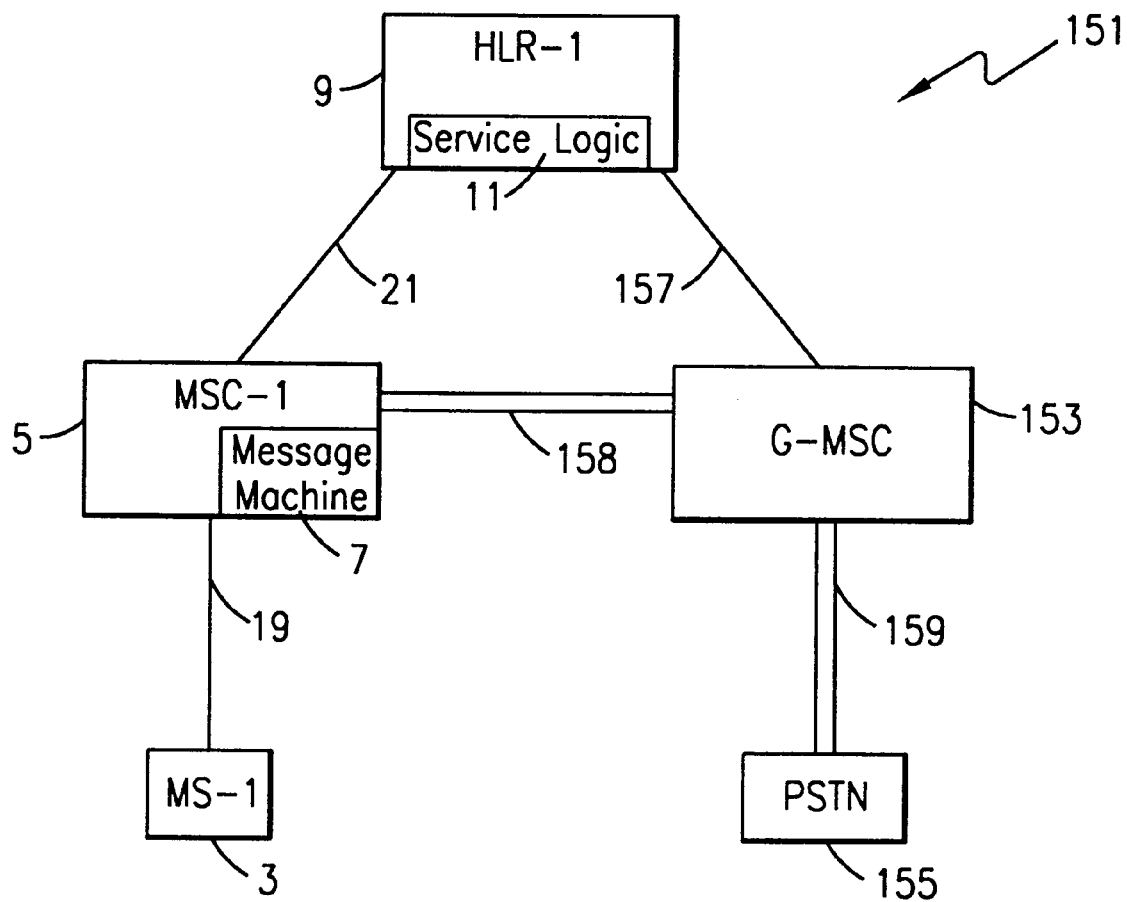
FIG. 6 is a simplified block diagram illustrating the components of a telecommunications system for an originating MS (MS-1) and a terminating PSTN telephone.

FIG. 6 is a simplified block diagram illustrating the components of a telecommunications system 151 for an originating MS (MS-1) 3 and a terminating PSTN telephone 155. The telecommunications system 151 includes the MS-1, the MSC-1 (5) having the message machine 7, the HLR-1 (9) having service logic 11, a gateway mobile switching (G-MSC) 153, PSTN 155, and trunks 158 and 159.

MS-1, MSC-1, and the HLR-1 function in exactly the same way as described in FIG. 1. However, the called party is a telephone within the PSTN 155. The G-MSC 153 provides a gateway between the radio telecommunications network 151 and the PSTN 155. The trunks 158 and 159 are the physical connections between the MSC-1, G-MSC 153, and PSTN 155.

Figure 7:
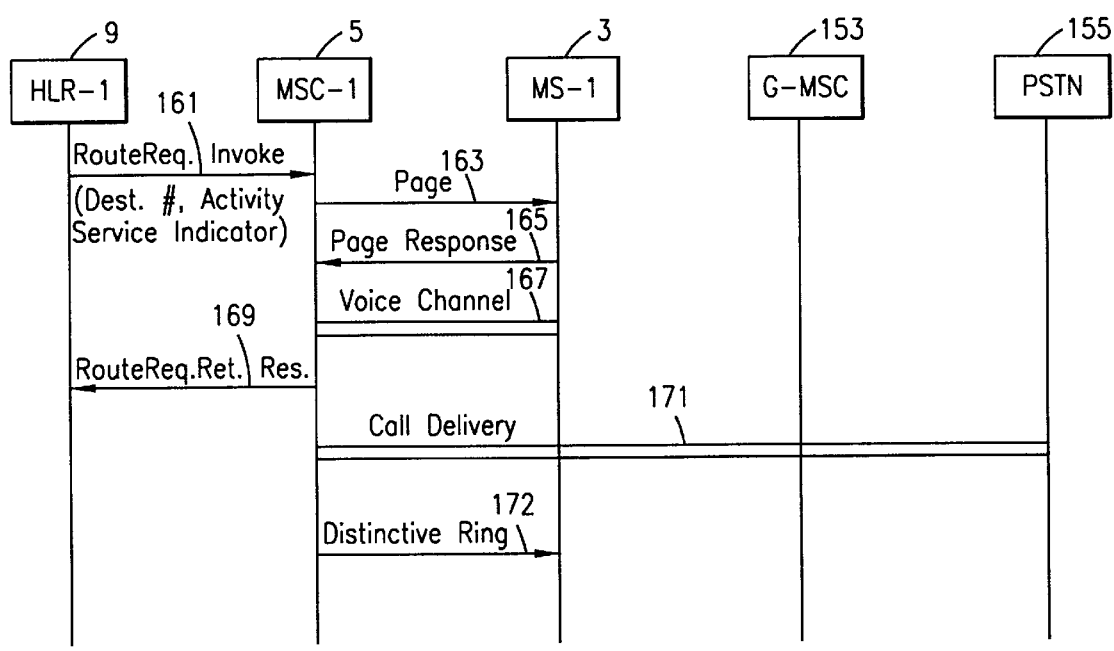
FIG. 7 is a signaling diagram illustrating the activity call service process for an originating MS (MS-1) and a terminating PSTN telephone according to the teachings of the present invention.

Once the activity call service set-up is complete (as described in FIG. 2), the requested call is initiated at the designated time. FIG. 7 is a signaling diagram illustrating the activity call service process for an originating MS (MS-1) and a terminating PSTN telephone according to the teachings of the present invention. Referring to FIGS. 2, 6, and 7, the activity call process will be explained. When the service logic 11 within the HLR-1 has determined that the selected time (as inputed by the originating MS (MS-1) in the Activity Data Information message 31) has arrived, the service logic 11 prompts the HLR-1 to send a Route Request (ROUTREQ) Invoke message 161 to the MSC-1. The ROUTREQ Invoke message 161 contains an activity service indicator, prompting the MSC-1 to generate a distinctive ringing at call connection. Additionally, the ROUTREQ Invoke message 161 includes the destination number to which the call will be connected. The HLR-1 sends the destination number to the MSC-1 for analysis when the destination number is based within the PSTN 155. If the MS-1 is not busy, the MSC-1 then sends a Page 163 to the MS-1 to verify the availability of the MS-1. If the MS-1 is available, it sends a Page Response message 165 to the MSC-1. Once, the MSC-1 receives the Page Response message 165, the MS-1 is connected to a voice channel 167 with the MSC-1. Upon establishing the voice channel 167, the MSC-1 sends a ROUTREQ Return Result message 169 to the HLR-1 indicating the availability of the MS-1.

If the MS-1 is busy, the HLR-1 waits until the MS-1 is idle and then starts the process again. If the MS-1 cannot be found (i.e., no page response is received), the activity call service may be attempted again after a specified time, depending on the level of activity call service to which the MS-1 subscribes. After a specific number of repetitions determined by the radio telecommunications network operator, the call is terminated for that activity call request.

At step 171, the MSC-1 seizes trunks 158 and 159 to the PSTN. At call connection, MSC-1 sends MS-1 a distinctive ring 172 to distinguish the call from a regular call. Once the call is connected, the data stored for the requested activity call service is deleted from the HLR-1.

If the PSTN telephone is busy, the call can not be connected and the MSC-1 sends a message to the MS-1 indicating the status of the PSTN telephone via the message machine 7 within the MSC-1. The MS-1 is provided the option of repeating the activity call after a predetermined time period such as, for example, ten minutes, or terminating the activity call request. This procedure is illustrated in steps 219 through 227 of FIG. 8C.

Figure 8A:
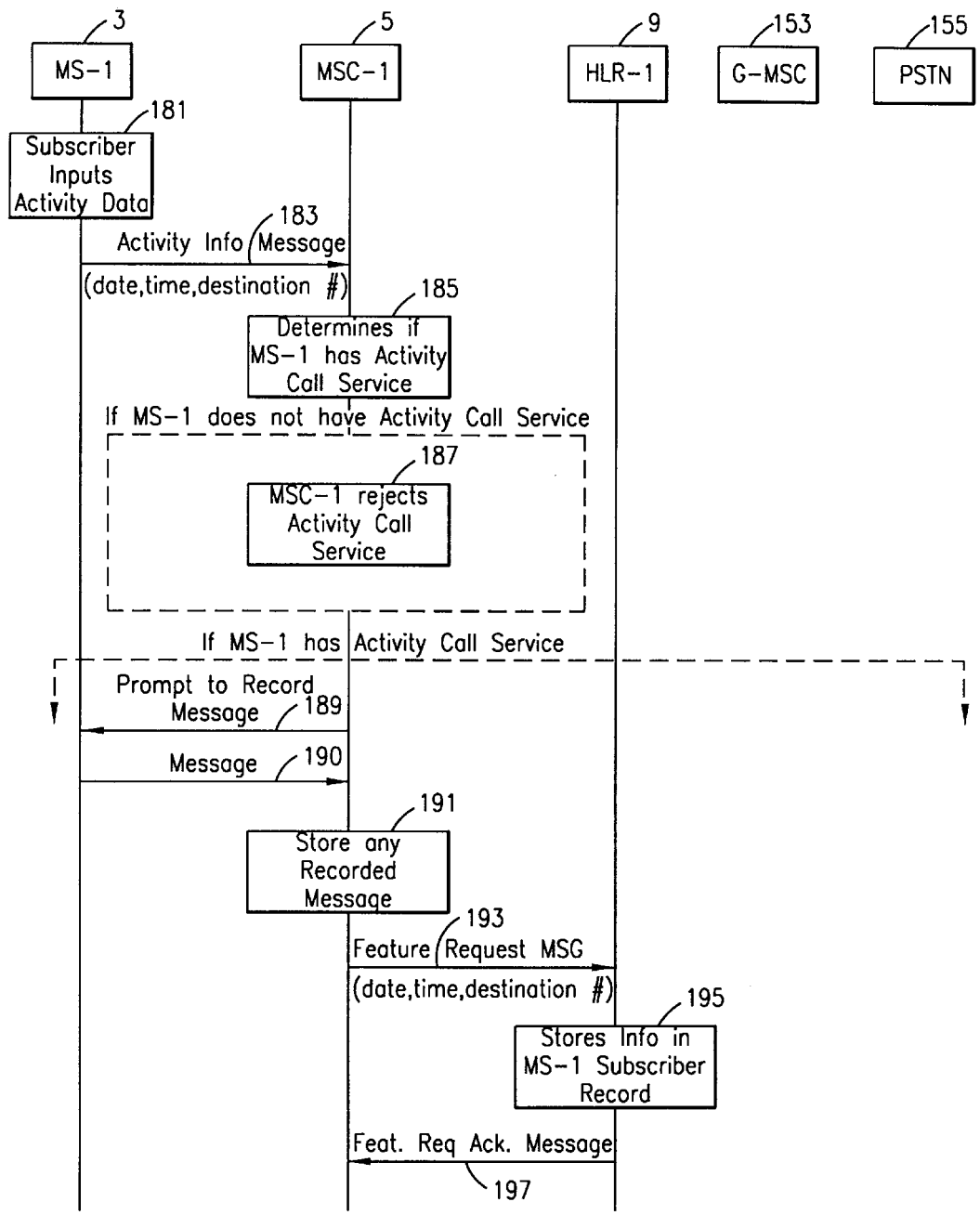
FIGS. 8A–8D are flow charts outlining the steps of the method of activity call service for an originating mobile station (MS-1) to a PSTN telephone according to the teachings of the present invention.

FIGS. 8A–8D are flow charts outlining the steps of the method of activity call service for an originating mobile station (MS-1) 3 to a PSTN telephone 155 according to the teachings of the present invention. Referring to FIGS. 2, 6, 7, and 8A–8D, the method will now be described. IN FIG. 8A, the method begins at step 181, by a mobile subscriber inputing activity data (as described in FIG. 2) into MS-1. For example, the mobile subscriber may input #ZZ*DDMMYY*HHMMSS* NNNNNNN, where ZZ is the request code for activity call service, DDMMYY is the date, HHMMSS is the time for which the service is requested, and NNNNNNN is either the number where the call is originating if the mobile subscriber is sending a message to himself or the number where the call is to be placed or the message is to be sent.

At step 183, the MS-1 sends an Activity Data Information message containing the date, time, destination number and voice message (if required) to the MSC-1. In step 185, in the situation where the network operator offers the service as a paid option, upon receipt of the Activity Data Information message, the MSC-1 determines if the MS-1 subscribes to activity call service. If the MS-1 does not subscribe to activity call service, the method moves to step 187 where the request for the activity call service is rejected. However, if the MS-1 does subscribe to activity call service, the method moves from step 185 to step 189 where the MSC-1 prompts the MS-1 to record a message. In step 190, a verbal message may optionally be sent by the MS-1 to the MSC-1. Next, in step 191, the MSC-1 stores the recorded message, if any, in the message machine 7(FIG. 6). Then in step 193, the MSC-1 sends a Feature Request message containing the date, time and destination number to the HLR-1. In step 195, the HLR-1 stores the information in the MS-1's subscriber record. Then, in step 197, the HLR-1 sends a Feature Request Acknowledgment message to the MSC-1.

Figure 8B:
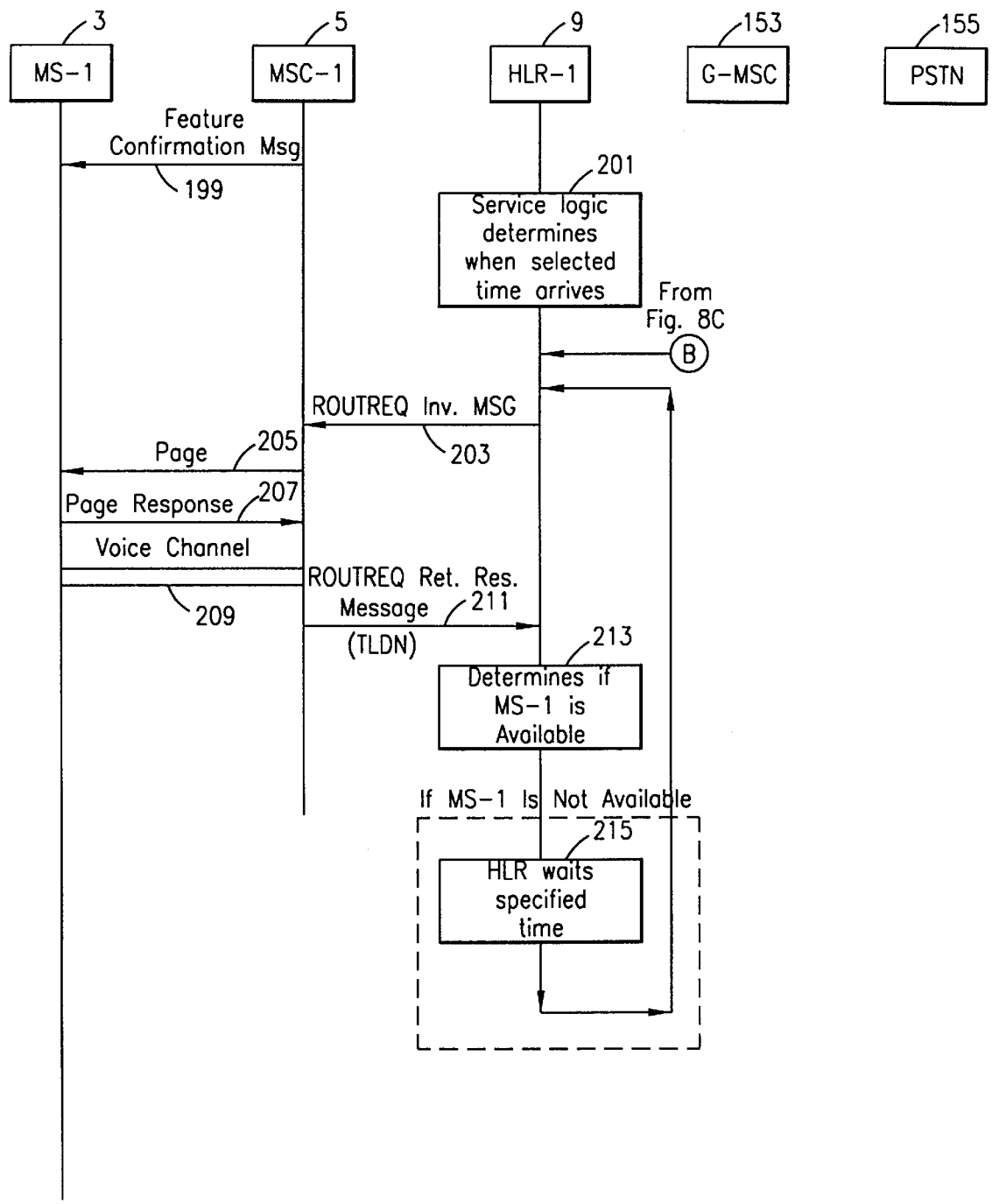

The process then continues in FIG. 8B. In step 199, the MSC-1 then sends a Feature Confirmation message to the MS-1 indicating that the selected activity call service is active. The Feature Confirmation message may be a verbal message or an aural indication produced and sent from the message machine 7.

In step 201, the service logic 11 in the HLR-1 (FIG. 6) determines when the selected time, as inputed by the MS-1 in the Activity Data Information message, has arrived. Then, in step 203, the HLR-1 verifies the availability of the MS-1 by sending a ROUTREQ Invoke message to the MSC-1. In step 205, if the MS-1 is not busy, the MSC-1 sends a Page to the MS-1. In step 207, if the MS-1 is available, the MS-1 responds by sending a Page Response message to the MSC-1. Next in step 209, the MSC-1 sets up a voice channel with the MS-1, if the MS-1 is available. In step 211, the MSC-1 then sends a ROUTREQ Return Result message to the HLR-1, indicating the availability of MS-1 and a routing number such as a TLDN.

Next, in step 213, it is determined in the HLR-1 whether the MS-1 is available or unavailable (i.e., busy or power off). If it is determined that the MS-1 is not available, the method moves from step 213 to step 215, where the HLR-1 waits a specified amount of time, depending on the level of activity call service that the MS-1 subscribes. Then, the method moves from step 215 to step 203 where the process begins again.

Figure 8C:
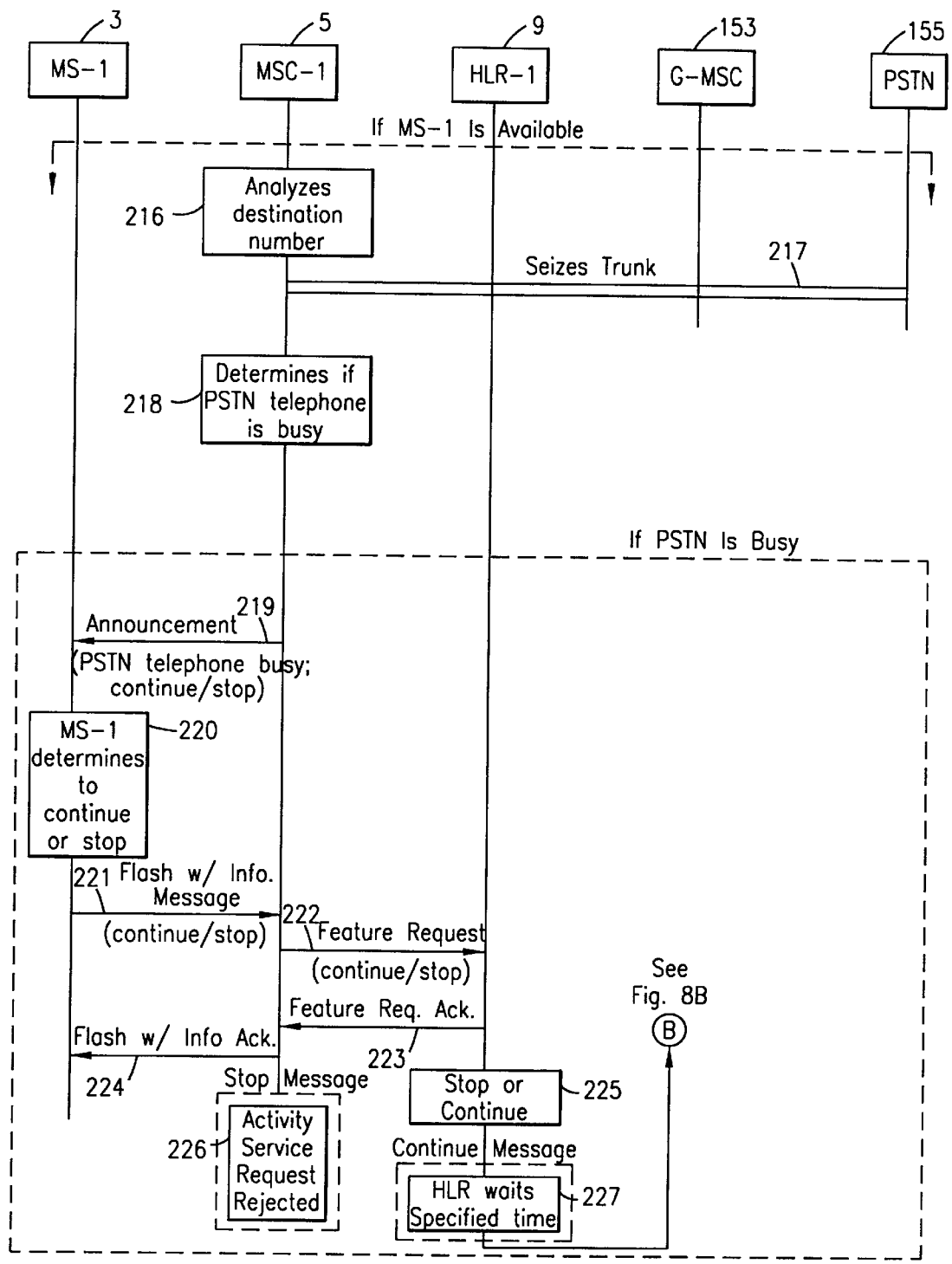

If, however, the MS-1 is available at step 213, the method moves from step 213 to step 216 in FIG. 8C where the MSC-1 analyzes the destination number sent in the ROUTREQ Invoke message and determines the location of the PSTN telephone. In step 217, the MSC-1 determines that the telephone associated with the destination number is within the PSTN 155 and seizes dedicated trunks 158 and 159. Next, in step 218, MSC-1 determines if the PSTN telephone is busy. The MSC-1 knows if the PSTN telephone is busy if the call cannot be connected.

If the MSC-1 determines that the PSTN telephone is busy, the method moves to step 219 where an announcement is sent from MSC-1, utilizing the message machine 7 (FIG. 6), to the MS-1 indicating the busy status of the PSTN telephone. In the announcement, the MS-1 may be given the option of repeating the activity call service after a predetermined time period or stopping the activity call request. The MS-1 subscriber chooses to "continue" the activity call service request or to "terminate" the request. In step 220, the MS-1 determines to continue or stop by inputting a code, such as "1" for option 1 or "2" for option 2. Then, in step 221, the MS-1 sends a Flash with Info message to the MSC-1 containing the chosen option.

In step 222, the MSC-1 sends a Feature Request message, with the continue or stop order, to the HLR-1. In step 223, the HLR-1 sends a Feature Request Acknowledgment to the MSC-1, indicating receipt of the Feature Request message. Next, in step 224, the MSC-1 sends a Flash with Info Acknowledgment message to the MS-1. Next, in step 225, the HLR-1 determines if the MS-1 wants to continue or terminate the activity call request. If the MS-1 is stopping the request, the HLR orders the MSC-1 to stop service at step 225 and the activity service request is rejected at step 226. However, if the MS-1 chooses to continue, the method moves from step 225 to step 227 where the HLR-1 waits the predetermined time period and then initiates the activity service call request again. Then, after the time period has passed, the method returns to step 203 (FIG. 8B).

Figure 8D:
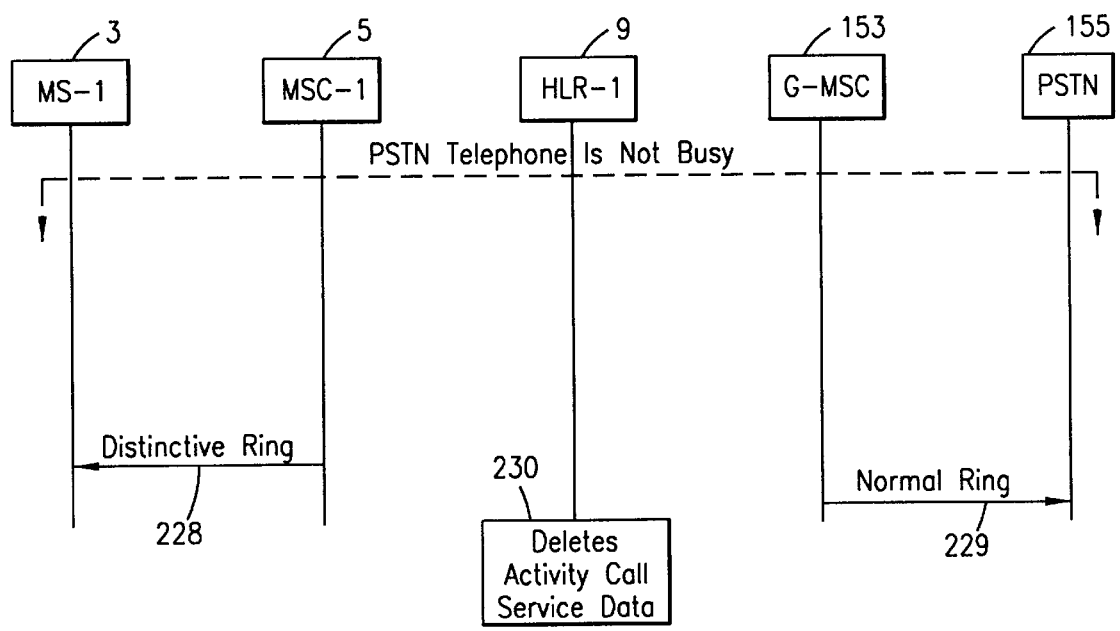

If the MSC-1 determines that the PSTN telephone is not busy in step 218, the method then moves to FIG. 8D, step 228. In step 228, at call alert, the MS-1 may receive a distinctive ring to distinguish the call from a regular call. Then, in step 229, the PSTN telephone may receive a normal alert signal alerting the PSTN telephone of an incoming call. Then, in step 230, the HLR-1 deletes the activity call service data stored within the HLR-1.

Figure 9:
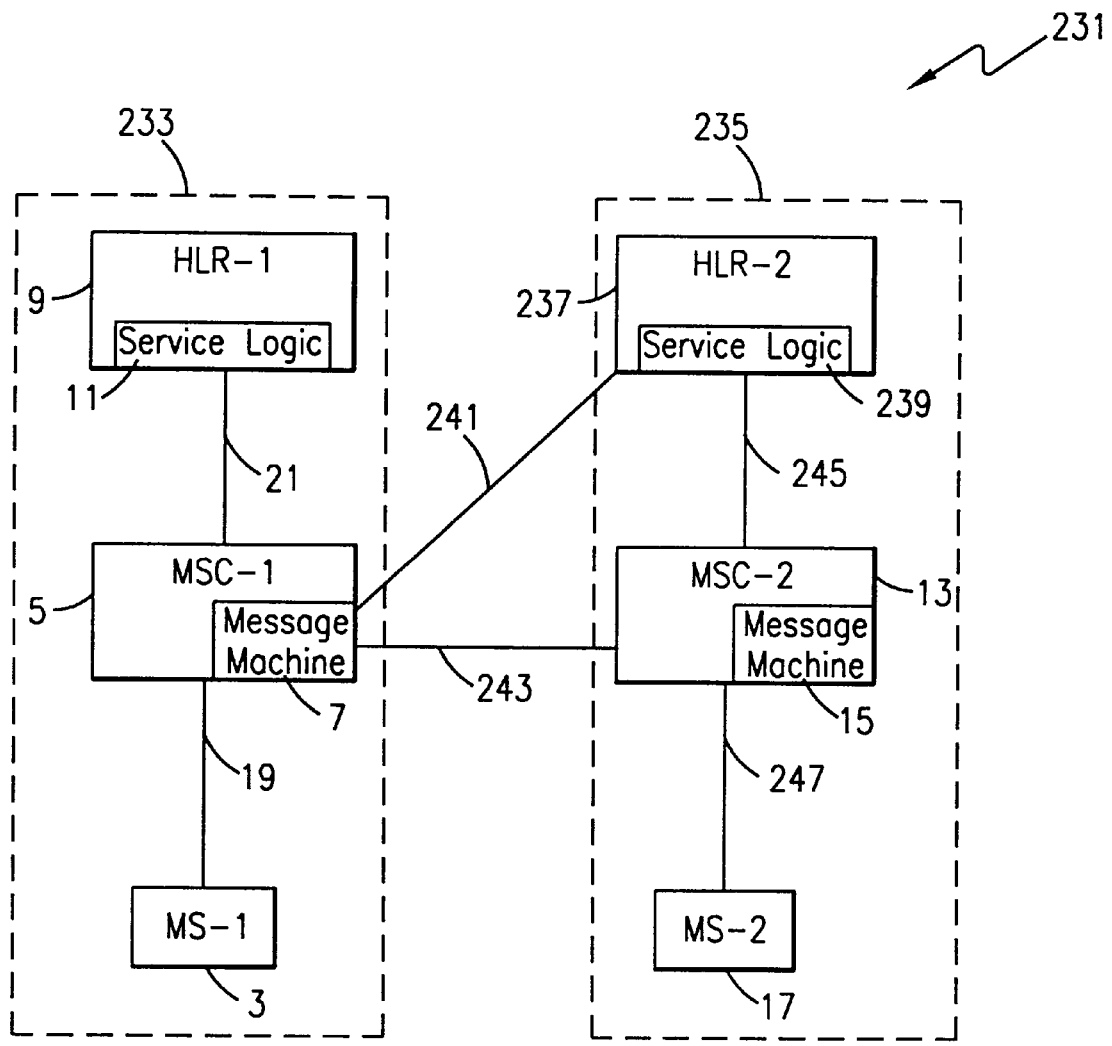
FIG. 9 is a simplified block diagram illustrating the components of a telecommunications system for an originating MS (MS-1) and a terminating MS (MS-2) using different HLRs according to the teachings of the present invention.

FIG. 9 is a simplified block diagram illustrating the components of a telecommunications system 231 for an originating MS (MS-1) 3 and a terminating MS (MS-2) 17 using different HLRs according to the teachings of the present invention. The telecommunications system 231 includes the MS-1 located within a service area 233 of MSC-1 (5) which is associated with the HLR-1 (9), the MSC-1 having a message machine 7. The MS-2 is located within a service area 235 of MSC-2 which is associated with an HLR-2 (237), the MSC-2 having the message machine 15. The components are connected by communications links 19, 21, 241, 243, 245, and 247, as shown.

With the addition of another HLR, the MSC-1 communicates with the HLR-2 and the MSC-2 through communications links 241 and 243, respectively. The functions described for the MS-1, the MSC-1, and the HLR-1 are all the same as discussed in FIG. 1. Additionally, the activity call service set-up is the same as described in FIG. 2.

Figure 10:
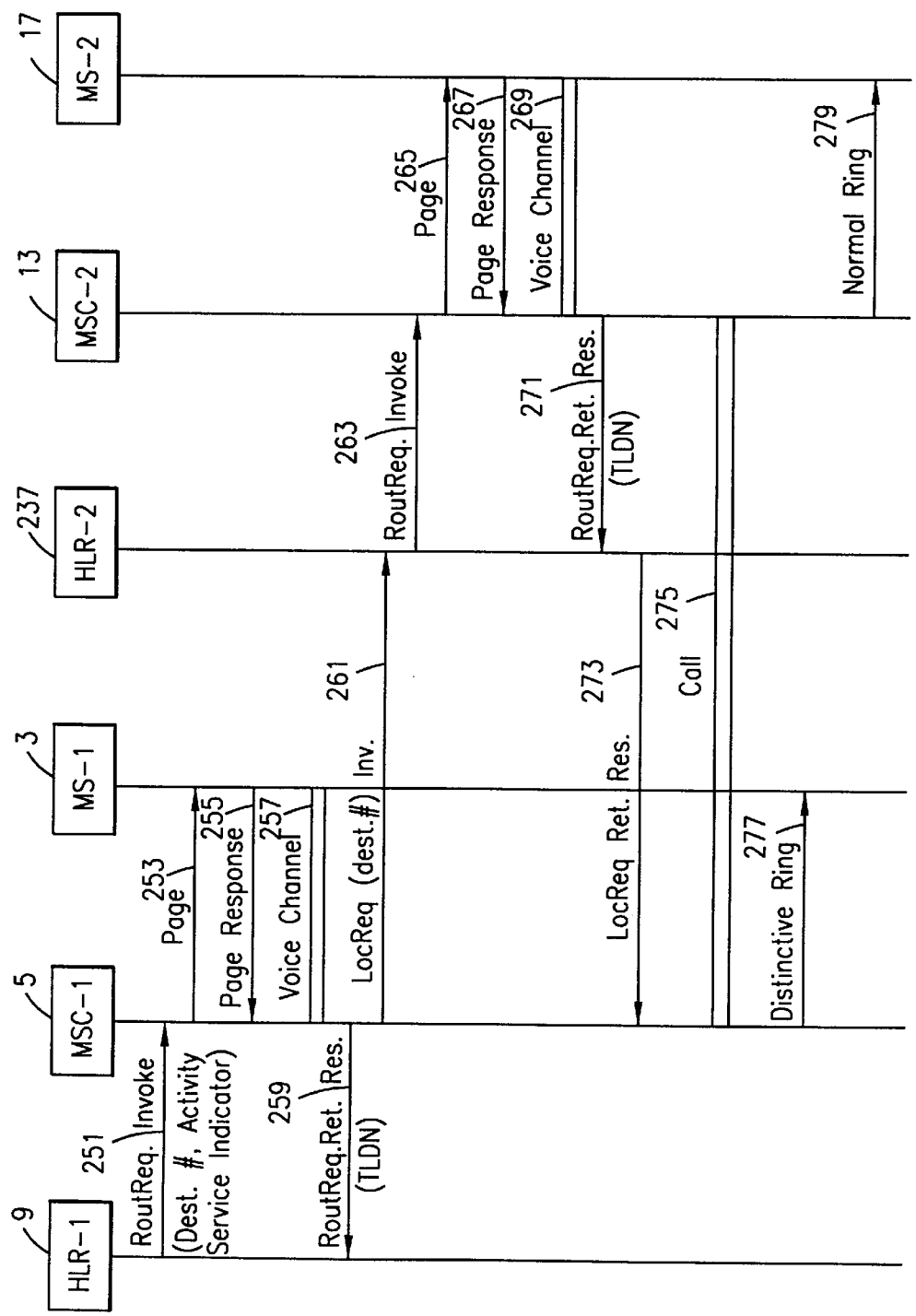
FIG. 10 is a signaling diagram illustrating the activity call service process for an originating MS (MS-1) and a terminating MS (MS-2) using different HLRs according to the teachings of the present invention.

Once the activity call service set-up is complete, the system initiates the requested call at the designated time. FIG. 10 is a signaling diagram illustrating the activity call service process for an originating MS (MS-1) and a terminating MS (MS-2) using different HLRs according to the teachings of the present invention. Referring to FIGS. 2, 4, 9, and 10, the activity call process will be explained. When the service logic 11 within the HLR-1 has determined that the selected time, as inputed by the MS-1 in the Activity Data Information message 31, has arrived, the service logic 11 prompts the HLR-1 to send a Route Request (ROUTREQ) Invoke message 251 to the MSC-1. The ROUTREQ Invoke message 251 contains an activity service indicator, prompting the MSC-1 to generate a special ringing at call connection. Additionally, when the called party is serviced by a different HLR, the ROUTREQ Invoke message 251 also contains the destination number. If the MSC is not busy, the MSC-1 then sends a Page 253 to the MS-1 to verify the availability of the MS-1. If the MS-1 is available, the MS-1 sends a Page Response message 255 acknowledging receipt of the Page 253 to the MSC-1. Once, the MSC-1 receives the Page Response message 255, the MS-1 is connected to a voice channel 257 with the MSC-1. Upon establishing the voice channel 257, the MSC-1 sends an ROUTREQ Return Result message 259 to the HLR-1.

If the MS-1 is busy, the HLR-1 waits until the MS-1 is idle before repeating the ROUTREQ Invoke message 251 to the MSC-1. If the MS-1 cannot be found, the activity call service may be attempted again after a specified time, depending on the level of activity call service to which the MS-1 subscribes. After a specific number of repetitions determined by the radio telecommunications network operator, the call is terminated for that activity call request.

Once the HLR-1 receives the ROUTREQ Return Result message 259 indicating the available status of the MS-1, the MSC-1 sends a Location Request (LOCREQ) Invoke message 261 to the HLR-2. The HLR-2 then sends a ROUTREQ Invoke message 263 to the MSC-2 to verify the availability of the MS-2. If the MS-2 is not busy, the MSC-2 then pages the MS-2 at 265. If the MS-2 is available, the MS-2 responds by sending a Page Response message 267 to the MSC-2 indicating receipt of the Page 265. Once the MSC-2 receives the Page Response message 267, the MSC-2 sets up a voice channel 269 with the MS-2. Then, the MSC-2 sends a ROUTREQ Return Result message 271 containing a roaming routing number, such as a TLDN, to the HLR-2 indicating the routing number of the MS-2. The HLR-2 then sends a LOCREQ Return Result message 273, containing the Roaming Routing Number, to the MSC-1.

Upon receipt of the LOCREQ Return Result message 273, the MSC-1 delivers the call at 275 to the MSC-2. At call connection, the MS-1 receives a distinctive ring 277 to distinguish the call from a regular call. The MS-2 receives a normal ring 279 alerting the MS-2 of an incoming call. Once the call is connected, the data stored for the requested activity call service is deleted from the HLR-1.

If the MS-2 is busy or cannot be found (e.g., the power is off on the MS-2), the HLR-2 sends a message to the MS-1 indicating the status of the MS-2 via the message machine 7 within the MSC-1. The MS-1 is provided the option of repeating the activity call after a predetermined time period such as, for example, ten minutes, or terminating the activity call request. This procedure is illustrated in steps 333 through 351 of FIG. 11D.

Figure 11A:
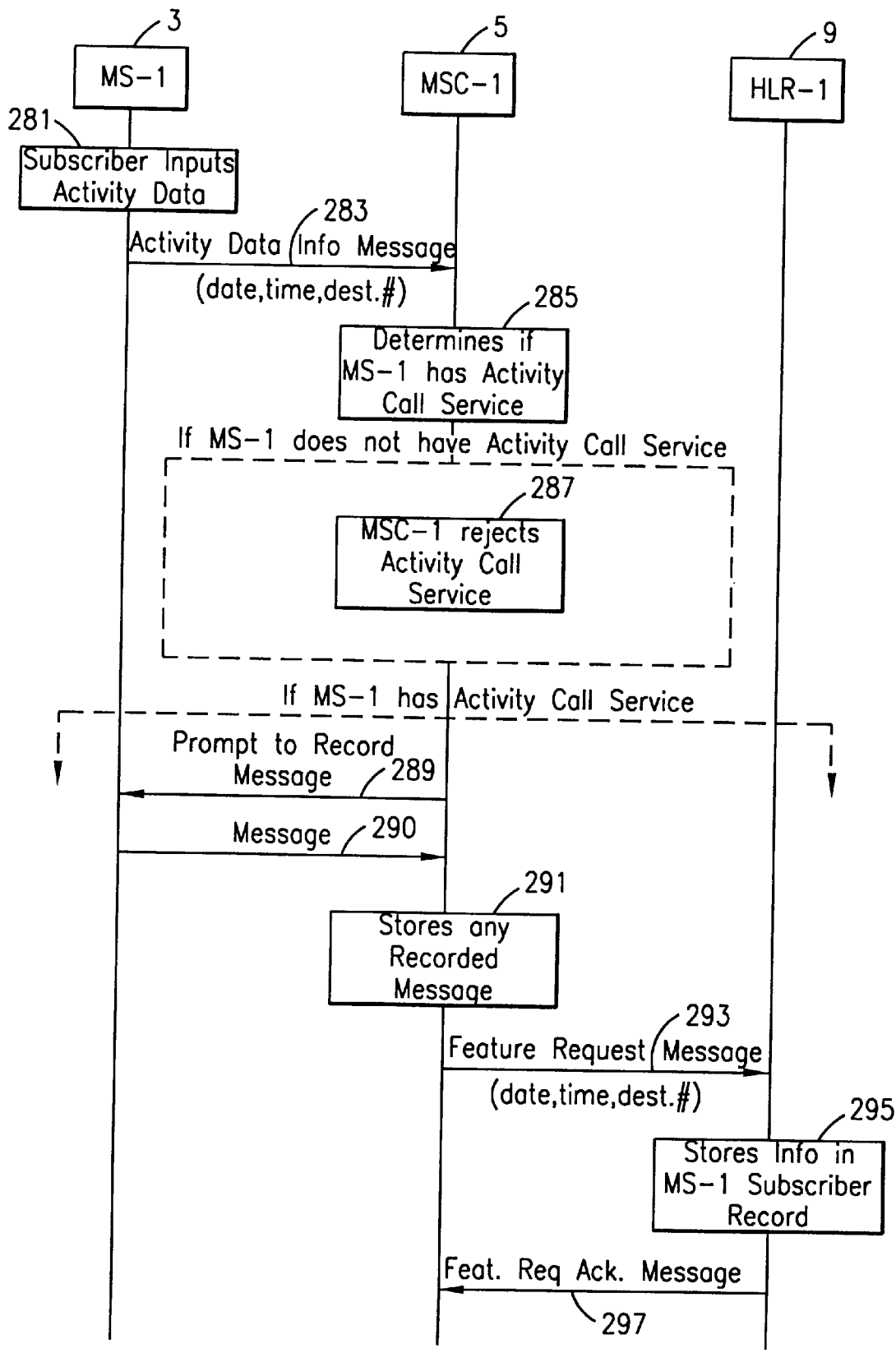

FIGS. 11A–11E are flow charts outlining the steps of the method of activity call service for an originating MS (MS-1) 3 and a terminating MS (MS-2) 17 using different HLRs according to the teachings of the present invention. Referring to FIGS. 2, 4, 9, 10 and 11A–11E, the method will now be described. In FIG. 11A, the method begins at step 281, by a mobile subscriber inputing activity data (as described in FIG. 2) into the MS-1.

At step 283, the MS-1 sends an Activity Data Information message containing the date, time, destination number and voice message (if required) to the MSC-1. In step 285, in the situation where the network operator offers the service as a paid option, upon receipt of the Activity Data Information message, the MSC-1 determines if the MS-1 subscribes to activity call service. If the MS-1 does not subscribe to activity call service, the method moves to step 287 where the request for the activity call service is rejected. However, if the MS-1 does subscribe to activity call service, the method moves from step 285 to step 289 where the MSC-1 prompts the MS-1 to record a message. In step 290, a verbal message may optionally be sent to the MSC-1. Next, in step 291, the MSC-1 stores the recorded message, if any, in the message machine 7. Then in step 293, the MSC-1 sends a Feature Request message containing the date, time, and destination number to the HLR-1. In step 295, the HLR-1 stores the information in the MS-1's subscriber record. Then, in step 297, the HLR-1 sends a Feature Request Acknowledgment message to the MSC-1.

Figure 11B:
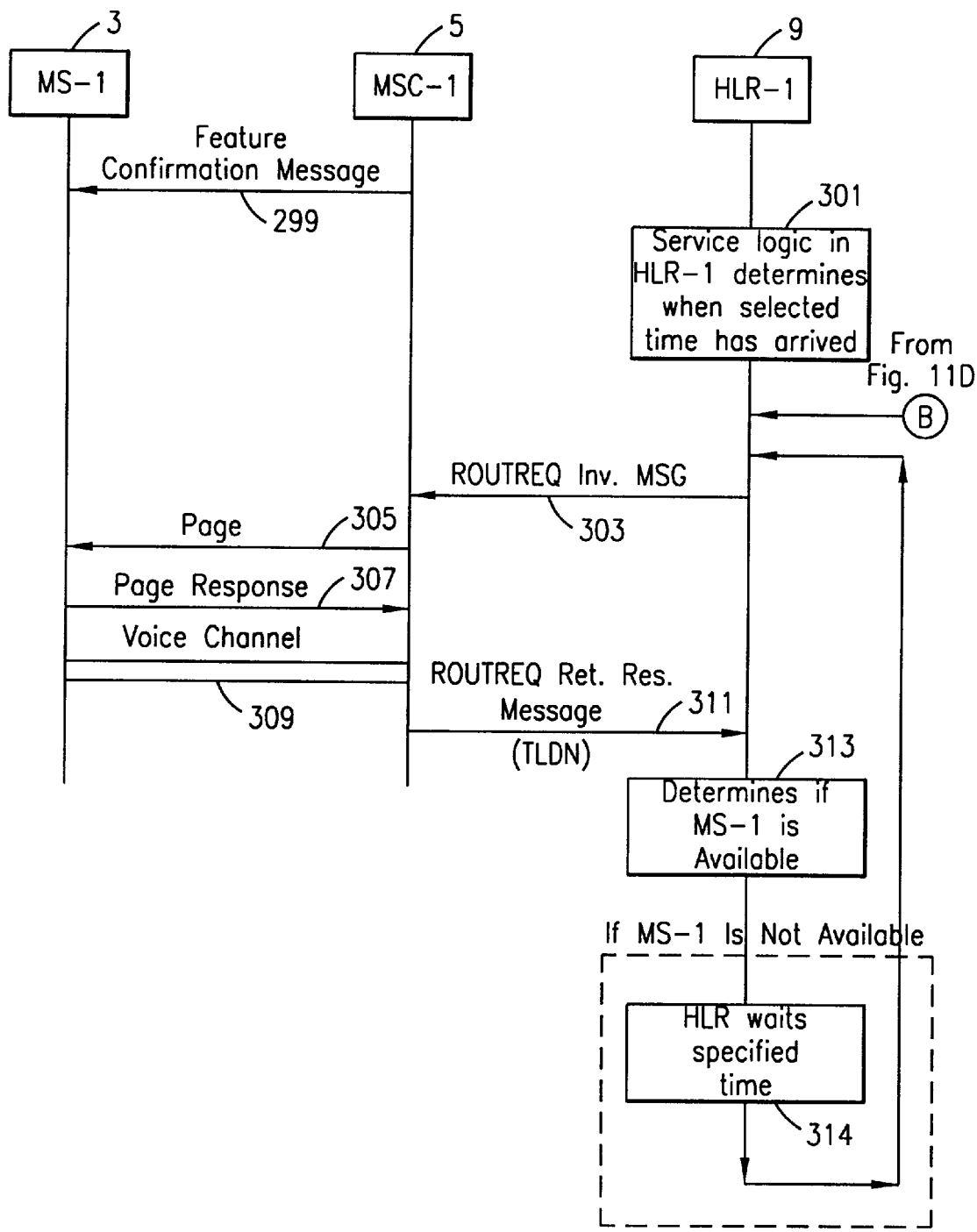

The process then continues in FIG. 11B. In step 299, the MSC-1 then sends a Feature Confirmation message to the MS-1 indicating that the selected activity service is active. The Feature Confirmation message may be a verbal message or an aural indication produced and sent from the message machine 7.

In step 301, the service logic 11 in the HLR-1 (FIG. 9) determines when the selected time, as inputed by the MS-1 in the Activity Data Information message, has arrived. In step 303, the HLR-1 verifies the availability of the MS-1 by sending a ROUTREQ Invoke message to the MSC-1. In step 305, if the MS-1 is not busy, the MSC-1 sends a Page to the MS-1. In step 307, if the MS-1 is available, the MS-1 responds by sending a Page Response message to the MSC-1. Next in step 309, the MSC-1 sets up a voice channel with the MS-1, if the MS-1 is available. In step 311, the MSC-1 then sends a ROUTREQ Return Result message to the HLR-1, indicating the availability of MS-1 and a routing number such as a TLDN.

Next, in step 313, it is determined in the HLR-1 whether the MS-1 is available or unavailable (i.e., busy or power off). If it is determined that the MS-1 is not available, the method moves from step 313 to step 314, where the HLR-1 waits a specified amount of time, depending on the level of activity call service to which the MS-1 subscribes. Then, the method moves from step 314 to step 303 where the process begins again.

Figure 11C:
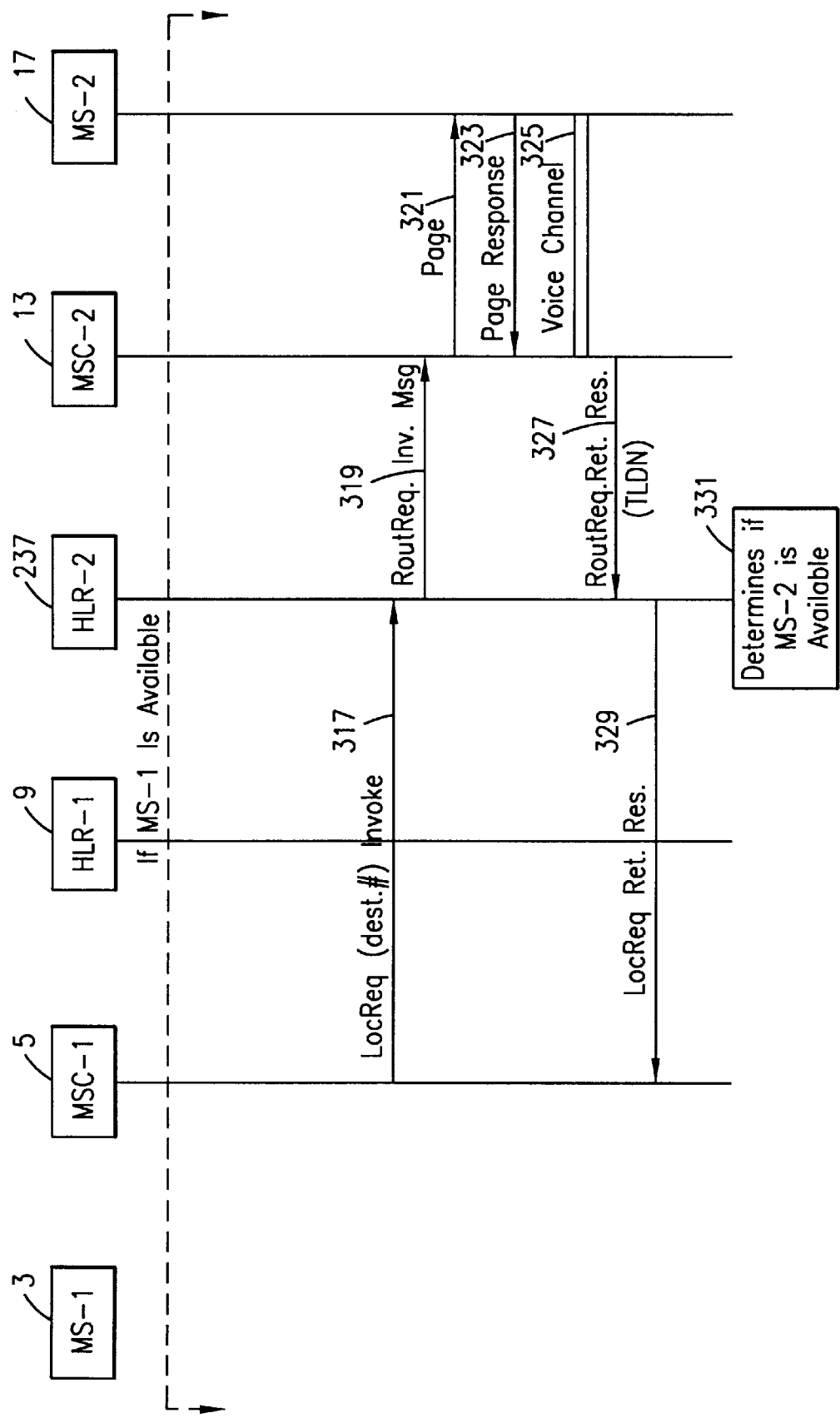

The process then continues in FIG. 11C. If it is determined at step 313 that the MS-1 is available, the method moves from step 313 to step 317 where the MSC-1 sends a LOCREQ Invoke message to the HLR-2. The HLR-2, in step 319, then determines the availability of MS-2. This is done by the HLR-2 sending a ROUTREQ Invoke message to the MSC-2. Next, in step 321, if the MS-2 is not busy, the MSC-2 sends a Page to the MS-2. In step 323, if the MS-2 is available, the MS-2 responds to the Page by sending a Page Response to the MSC-2 indicating the availability of MS-2. In step 325, the MSC-2 sets up a voice channel between the MSC-2 and the MS-2, if the MS-2 is available. Next, in step 327, the MSC-2 sends a ROUTREQ Return Result message containing a roaming routing number, such as a TLDN, to the HLR-2 indicating the routing number and status of the MS-2. In step 329, the HLR-2 sends a LOCREQ Return Result message to the MSC-1, indicating the routing number and availability of the MS-2. Then, in step 331, the HLR-2 determines the status of MS-2 (i.e., whether MS-2 is available).

If the HLR-2 determines that the MS-2 is not available, the method moves to FIG. 11D, step 333 where an Initiation message, containing the status of MS-2 (e.g., busy or no response), is sent from the HLR-2 to the MSC-1. Next, in step 335, an announcement is sent from MSC-1, utilizing the message machine 7 (FIG. 1), to the MS-1 indicating the non-availability of the MS-2. In the announcement, the MS-1 may be given the option of repeating the activity call service after a predetermined time period or stopping the activity call request. The MS-1 chooses to "continue" the activity call service request or to "terminate" the request. In step 337, the MS-1 subscriber determines to continue or stop by inputting a code, such as "1" for option 1 or "2" for option 2. Then, in step 339, the MS-1 sends a Flash with Info message to the MSC-1 containing the chosen option.

In step 341, the MSC-1 sends a Feature Request message, with the continue or stop order, to the HLR-1. In step 343, the HLR-1 sends a Feature Request Acknowledgment to the MSC-1, indicating receipt of the Feature Request message. Next, in step 345, the MSC-1 sends a Flash with Info Acknowledgment message to the MS-1. Next, in step 347, the HLR-1 determines if the MS-1 wants to continue or terminate the activity call request. If the MS-1 is stopping the request, the HLR orders the MSC-1 to stop service at step 347 and the activity service request is rejected at step 349. However, if the MS-1 chooses to continue, the method moves from step 347 to step 351 where the HLR-1 waits the predetermined time period and then initiates the activity service call request again. Then, after the time period has passed, the method returns to step 303 (FIG. 11B).

Figure 11E:
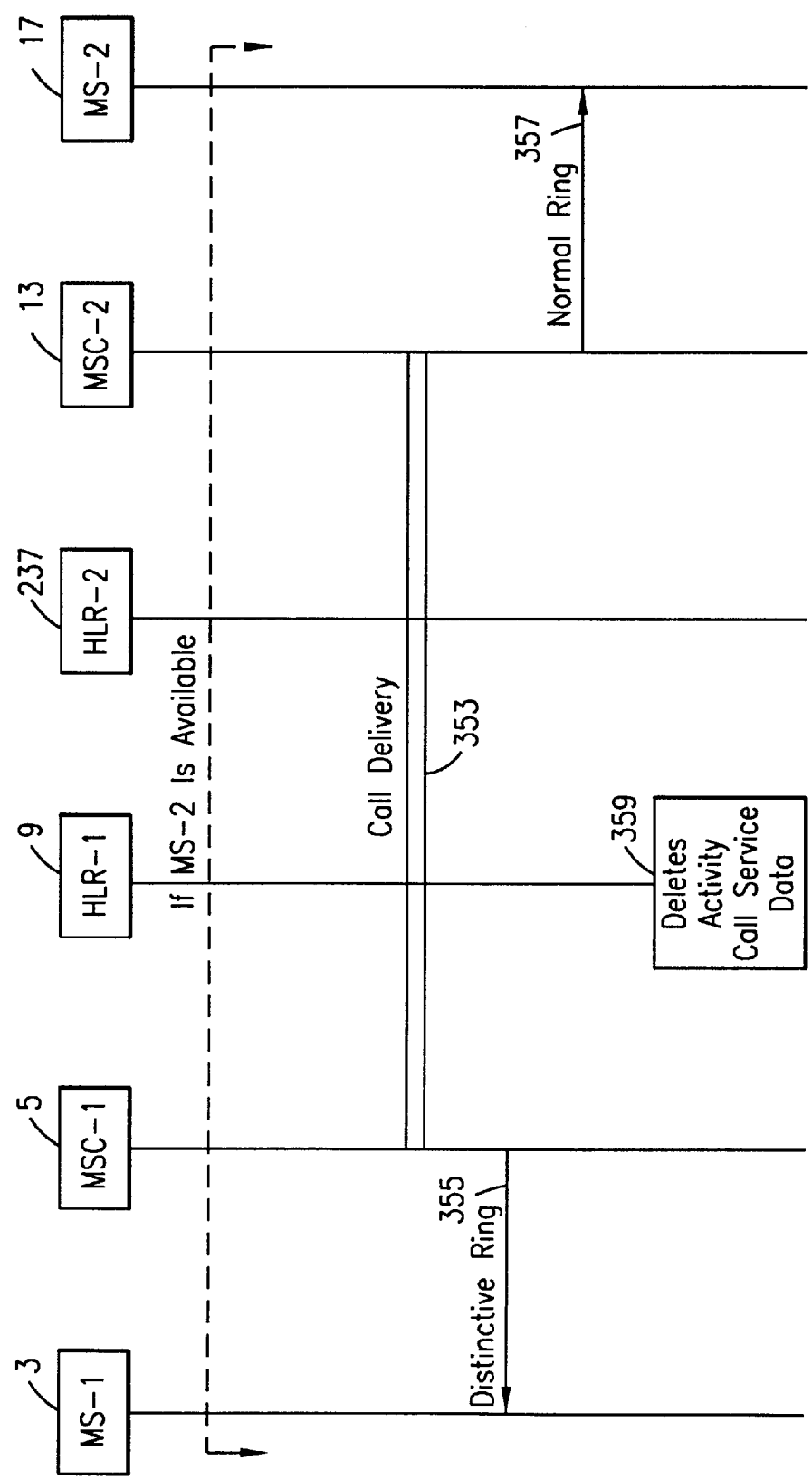

In step 331, if the HLR-2 determines that the MS-2 is available, the method moves from step 331 to FIG. 11E, step 353, where the MSC-1 establishes a trunk with the MSC-2, resulting in call delivery. At call alert, the MS-1 may receive a distinctive ring 355 to distinguish the call from a regular call. The MS-2 may receive a normal ring 357 alerting the MS-2 of an incoming call. Next, in step 359, the HLR-1 deletes the activity call service data stored within the HLR-1.

Thus, the system and method of the invention notifies the mobile subscriber of impending activities. Additionally, the invention automatically sets up important telephone calls at selected times. Therefore, the mobile subscriber is reminded to place important telephone calls. The invention may also be used as a message reminder system which sends recorded messages to the mobile subscriber at a selected time. Overall, this system and method provides many services to a mobile subscriber by using his cellular telephone.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims.

What is claimed is:

1. A system in a radio telecommunications network for automatically setting up a call at a selected time between an originating mobile station (MS) and a terminating party, said system comprising:
    a first mobile switching center (MSC) that services and controls an area where said originating MS is located;
    a first home location register (HLR) associated with said first MSC, said HLR including:
        means for storing said selected time and a destination number of said terminating party;
        service logic which determines when said selected time has arrived, and automatically initiates said call to said destination number at said selected time; and
    means for completing said call.

2. The system of claim 1 wherein said means for completing said call includes means for setting up a first voice channel between said originating MS and said first MSC.

3. The system of claim 2 further comprising means for notifying said originating MS of said call after automatic initiation of the call by the service logic.

4. The system of claim 3 wherein said means for notifying said originating MS of said call is a distinctive ringing.

5. The system of claim 4 further comprising a second MSC servicing and controlling an area where said terminating party is located and wherein said terminating party is a terminating MS.

6. The system of claim 5 wherein said means for completing said call includes means for setting up a second voice channel between said terminating MS and said second MSC and means for establishing a trunk between said first MSC and said second MSC.

7. The system of claim 5 wherein said second MSC is associated with said first HLR.

8. The system of claim 5 further comprising a second HLR associated with said second MSC for storing a routing number of said terminating MS.

9. The system of claim 4 further comprising means for determining whether said originating MS is busy and wherein said service logic initiates said call when said originating MS is idle.

10. The system of claim 9 further comprising means for determining whether said terminating MS is idle and available and wherein said service logic initiates said call when said terminating MS is idle and available.

11. The system of claim 4 wherein said first MSC includes means for storing a recorded message from said originating MS, said service logic determines when said recorded message is delivered to said originating MS, and said system further comprises means for delivering said recorded message to said originating MS.

12. The system of claim 11 wherein said means for storing said recorded message includes a message machine in said first MSC.

13. The system of claim 12 wherein said means for delivering said recorded message includes means for setting up a first voice channel between said originating MS and said first MSC.

14. The system of claim 13 further comprising means for notifying said originating MS of said call.

15. The system of claim 14 further comprising a second MSC that services and controls an area where said terminating party is located, and wherein said terminating party is a terminating MS.

16. The system of claim 15 wherein said means for completing said call includes means for setting up a second voice channel between said terminating MS and said second MSC, and means for establishing a trunk between said first MSC and said second MSC.

17. The system of claim 16 further comprising means for determining whether said terminating MS is available and wherein said service logic directs said first MSC to deliver said recorded message to said originating MS when said terminating MS is available.

18. The system of claim 17 further comprising a second HLR associated with said second MSC for storing a routing number of said terminating MS.

19. A system in a radio telecommunications network for setting up a call at a selected time between a originating mobile station (MS) and a terminating MS, said system comprising:
    a first mobile switching center (MSC) servicing and controlling an area where said originating MS is located;
    a second MSC servicing and controlling an area where said terminating MS is located;
    a home location register (HLR) associated with said first MSC for storing said selected time and a destination number of said terminating party, said HLR including service logic which determines when said selected time has arrived and automatically initiates said call at said selected time; and
    means for completing said call, said means for completing said call including means for setting up a first voice channel between said originating MS and said first MSC, means for setting up a second voice channel between said terminating MS and said second MSC, and means for establishing a trunk between said first MSC and said second MSC.

20. A system in a radio telecommunications network for setting up a call at a selected time between a originating mobile station (MS) and a terminating telephone in a Public Switched Telephone Network (PSTN), said system comprising:
    a mobile switching center (MSC) servicing and controlling an area where said originating MS is located;
    a gateway mobile switching center (G-MSC) for connecting said terminating PSTN telephone to said radio telecommunications network;
    a home location register (HLR) associated with said MSC for storing said selected time and a destination number of said terminating party, said HLR including service logic which determines when said selected time has arrived and automatically initiates said call at said selected time; and
    means for completing said call.

21. The system of claim 20 wherein said means for completing said call includes means for setting up a voice channel between said originating MS and said first MSC.

22. The system of claim 21 further comprising means for notifying said originating MS of said call after automatic initiation of the call by the service logic.

23. The system of claim 22 wherein said means for notifying said originating MS of said call is a distinctive ringing.

24. The system of claim 23 further comprising means for establishing a first trunk between said MSC and said G-MSC and means for establishing a second trunk between said G-MSC and said PSTN.

25. The system of claim 24 further comprising means for determining whether said originating MS is busy and wherein said service logic initiates said call when said originating MS is idle.

26. The system of claim 25 further comprising means for determining whether said terminating MS is available and wherein said service logic initiates said call when said terminating MS is available.

27. The system of claim 23 wherein said MSC stores a recorded message from said originating MS, said service logic determines when said recorded message is delivered to said originating MS, and said system further comprises means for delivering said recorded message to said originating MS.

28. A method in a radio telecommunications network of automatically setting up a call at a selected time between a originating mobile station (MS) and a terminating party, said method comprising the steps of:

sending a message with data from said originating MS to a first mobile switching center (MSC), said message with data specifying said selected time and a selected destination for said call;

sending said data from said first MSC to a home location register (HLR);

storing said data, in said HLR;

determining, by service logic within HLR, that said selected time has arrived;

sending an instruction from the said HLR to the first MSC to automatically initiate the call;

establishing a first voice channel between first MSC and originating MS resulting from the initiated call;

determining if said terminating party is available; and connecting said originating MS to said terminating party, upon determining that said terminating party is available.

29. The method of claim 28, further comprising, after the step of determining, by service logic within said HLR, when said selected time has arrived, the step of notifying said originating MS of an impending call, upon determining that said selected time has arrived.

30. The method of claim 29 further comprising, after the step of determining, by service logic within said HLR, when said selected time has arrived, the step of determining if said originating MS is busy.

31. The method of claim 30 wherein a second MSC services an area in which said terminating party is located, and said method further comprises, after the step of determining if said terminating party is available, the step of establishing a second voice channel between said second MSC and said terminating party, upon determining that said terminating party is available.

32. The method of claim 31 wherein said step of connecting said originating MS to said terminating party includes establishing a trunk from said first MSC to said second MSC.

33. The method of claim 28 further comprising, after the step of connecting said originating MS to said terminating party, the step of deleting said data by said HLR.

34. The method of claim 28 wherein said step of sending a data message includes sending a recorded message to a first MSC, and said method further comprises:

after the step of sending, by said originating MS, a message with data specifying said selected time and a selected destination, the step of storing said recorded message by said first MSC; and after the step of determining if said terminating party is available, the step of delivering said recorded message to said originating MS.

35. A method in a radio telecommunications network of setting up a call at a selected time between an originating mobile station (MS) and a terminating party, said method comprising the steps of:

sending, from said originating MS to a first MSC, a message specifying said selected time and a selected destination for said call;

sending said selected time and said selected destination from said first MSC to a HLR;

storing of said selected time and said selected destination by said HLR;

determining, by service logic within said HLR, when said selected time has arrived;

sending an instruction from the said HLR to the first MSC to automatically initiate the call;

determining, by said first MSC, if said originating MS is busy;

establishing a first voice channel between said first MSC and said originating MS resulting from the initiated call, upon determining that said originating MS is idle;

determining if said terminating party is available;

waiting a specific time period by said HLR, upon determining that said terminating party is not available;

establishing a second voice channel between a second MSC servicing an area in which said terminating party is located and said terminating party, upon determining that said terminating party is available; and connecting said originating MS to said terminating party.

36. A method in a radio telecommunications network of automatically setting up a call at a selected time between a originating mobile station (MS) and a terminating party in a Public Switched Telephone Network (PSTN), said method comprising the steps of:

sending a message with data from said originating MS to a MSC, said message with data specifying said selected time and a selected destination for said call;

sending said data from said MSC to a HLR;

storing said data in said HLR;

determining, by service logic within said HLR, that said selected time has arrived;

sending an instruction from the said HLR to the first MSC to automatically initiate the call;

establishing a first voice channel between said first MSC and said originating MS resulting from the initiated call;

determining if said terminating party is available; and joining said MSC to a gateway mobile switching center (G-MSC) through a trunk, upon determining that said terminating party is available; and connecting said originating MS to said terminating party.

* * * * *